US010473257B2

(12) United States Patent
Tomomatsu et al.

(10) Patent No.: US 10,473,257 B2
(45) Date of Patent: Nov. 12, 2019

(54) ELECTRONIC DEVICE SUPPORT STAND

(71) Applicant: Seiko Epson Corporation, Tokyo (JP)

(72) Inventors: Shinsuke Tomomatsu, Matsumoto (JP); Yoshiki Kinoshita, Suwa (JP); Takaaki Inui, Matsumoto (JP); Hideki Furihata, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 405 days.

(21) Appl. No.: 15/358,693

(22) Filed: Nov. 22, 2016

(65) Prior Publication Data

US 2017/0150812 A1 Jun. 1, 2017

(30) Foreign Application Priority Data

Nov. 26, 2015 (JP) ................. 2015-230322
Nov. 26, 2015 (JP) ................. 2015-230323
Nov. 26, 2015 (JP) ................. 2015-230324
Jan. 5, 2016 (JP) ................. 2016-000409

(51) Int. Cl.
*F16M 11/04* (2006.01)
*G06F 1/16* (2006.01)
*H04M 1/04* (2006.01)
*F16M 11/10* (2006.01)

(52) U.S. Cl.
CPC .......... *F16M 11/041* (2013.01); *F16M 11/10* (2013.01); *G06F 1/1622* (2013.01); *G06F 1/1679* (2013.01); *H04M 1/04* (2013.01); *F16M 2200/024* (2013.01)

(58) Field of Classification Search
CPC .............. F16M 11/10; F16M 2200/024; G06F 1/1622; G07G 1/0018
See application file for complete search history.

(56) References Cited

U.S. PATENT DOCUMENTS

| 6,268,997 | B1 | 7/2001 | Hong | |
|---|---|---|---|---|
| 7,349,202 | B2 * | 3/2008 | Kano | ........................ G06F 1/16 248/179.1 |
| 7,611,112 | B2 * | 11/2009 | Lin | ........................ B60R 11/02 248/274.1 |
| 8,317,152 | B1 * | 11/2012 | Zhou | .................... F16M 11/041 248/122.1 |
| 8,567,739 | B2 * | 10/2013 | Zhou | ...................... F16M 11/10 16/326 |

(Continued)

FOREIGN PATENT DOCUMENTS

JP 08-261392 A 10/1996
JP H11261248 9/1999

(Continued)

*Primary Examiner* — Bradley Duckworth
(74) *Attorney, Agent, or Firm* — Workman Nydegger

(57) ABSTRACT

An electronic device support stand is a support stand for electronic devices that enables rotating the supported electronic device in a confined space with substantially no force while holding the electronic device securely. The electronic device support stand has a holding unit configured to hold an electronic device; and a base unit that supports the holding unit. The holding unit includes a pivot mechanism enabling rotating the supported electronic device with substantially no load around an axis parallel to the surface on which the base unit is placed.

8 Claims, 30 Drawing Sheets

(56) References Cited

U.S. PATENT DOCUMENTS

| | | | | |
|---|---|---|---|---|
| 8,864,089 B2* | 10/2014 | Hung | ............. | F16M 11/041 |
| | | | | 248/122.1 |
| 9,033,228 B2* | 5/2015 | Govindarajan | ........ | G06Q 90/00 |
| | | | | 235/383 |
| 9,129,274 B1* | 9/2015 | Mocko | ............. | G06Q 20/20 |
| 9,208,660 B2* | 12/2015 | Cho | ............. | G07G 1/0018 |
| 9,600,031 B2* | 3/2017 | Kaneko | ............. | G06F 1/1632 |
| 9,714,528 B2* | 7/2017 | Van Balen | ............. | A47F 7/0246 |
| 9,759,372 B2* | 9/2017 | Pigatti | ............. | F16M 11/041 |
| 9,972,173 B2* | 5/2018 | Nozaki | ............. | G07G 1/0027 |
| 10,100,971 B2* | 10/2018 | Yun | ............. | B60R 11/0241 |
| 2002/0126110 A1 | 9/2002 | Bowron | | |
| 2011/0037428 A1 | 2/2011 | Sakaguchi et al. | | |
| 2014/0086666 A1* | 3/2014 | Grziwok | ............. | F16M 11/14 |
| | | | | 403/56 |
| 2014/0130334 A1* | 5/2014 | Chun | ............. | F16M 11/041 |
| | | | | 29/525.01 |
| 2015/0108293 A1* | 4/2015 | Yorke | ............. | F16M 11/10 |
| | | | | 248/122.1 |
| 2016/0070964 A1* | 3/2016 | Conrad | ............. | G07G 1/0018 |
| | | | | 348/150 |
| 2016/0176357 A1* | 6/2016 | Maslakow | ............. | F16M 13/02 |
| | | | | 224/275 |
| 2017/0140615 A1* | 5/2017 | Larnac | ............. | G07G 1/0018 |
| 2017/0161704 A1* | 6/2017 | Rimer | ............. | A47F 9/00 |

FOREIGN PATENT DOCUMENTS

| | | |
|---|---|---|
| JP | 3078767 | 7/2001 |
| JP | 2003312374 | 11/2003 |
| JP | 2011041394 | 2/2011 |
| JP | 2011077273 | 4/2011 |
| JP | 2011-139589 A | 7/2011 |
| JP | 2012121541 | 6/2012 |
| JP | 2012226419 | 11/2012 |
| JP | 2013-91344 A | 5/2013 |
| JP | 3183264 | 5/2013 |
| JP | 3189574 | 3/2014 |
| JP | 2014-120972 A | 6/2014 |
| JP | 2015073201 | 4/2015 |

* cited by examiner

ELECTRONIC DEVICE SUPPORT STAND

Priority is claimed under 35 U.S.C. § 119 to Japanese Application Nos. 2015-230323 filed on Nov. 26, 2015, 2015-230324 filed on Nov. 26, 2015, 2015-230322 filed on Nov. 26, 2015 and 2016-000409 filed on Jan. 5, 2016, which are hereby incorporated by reference in their entirety.

BACKGROUND

1. Technical Field

The present invention relates to a support stand for an electronic device, and relates more particularly to an electronic device support stand that allows the held electronic device to rotate within a confined space while holding the device firmly with no play.

2. Related Art

Mobile electronic devices such as tablet computers and smartphones are now common. Such electronic devices may be held in the hand for use, or in a fixed location on a desk or counter, for example. Stands for supporting electronic devices in an upright position, for example, have therefore been developed.

When such an electronic device is fixed on such a stand, it may be desirable to change the orientation of the electronic device, making it desirable for the stand that holds the electronic device to allow the electronic device to rotate.

Electronic device support stands that allow the electronic device to rotate around a column perpendicular to the surface on which the stand is placed, or have a torque converter in the rotating column enabling the electronic device to be held at a desired angle, are known from the literature.

JP-A-2011-139589 describes such a stand for an image display device.

Such an electronic device support stand is needed when a tablet computer (terminal) is used to process sales transactions in a store, and in such applications preferably makes it easy for the customer to operate the tablet terminal to authorize a payment, for example. It is therefore desirable in such applications for the electronic device support stand to enable quickly switching the direction in which the supported tablet terminal faces (the orientation of the tablet terminal) between the operator and the customer; rotating the tablet terminal with minimal force because the orientation is changed frequently; reliably fixing the tablet terminal in a specific orientation so that operation of the tablet terminal is easy; and not taking up extra space to change the orientation.

Electronic device support stands of the related art do not satisfy such needs.

When the tablet terminal or other electronic device is held by the electronic device support stand, it is also desirable for the electronic device to be secured so that the electronic device does not move when operations are performed on the display surface of the tablet terminal or other electronic device.

SUMMARY

An electronic device support stand according to the invention is a support stand for electronic devices that enables rotating the supported electronic device in a confined space while holding the electronic device securely without moving.

An electronic device support stand according to one aspect of the invention has a holding unit configured to hold an electronic device; and a base unit that supports the holding unit. The holding unit includes a pivot mechanism enabling pivoting the supported electronic device with substantially no load around an axis parallel to the surface on which the base unit is placed.

This configuration enables changing the orientation of the supported electronic device with substantially no force in a confined space.

Preferably, the pivot mechanism secures the supported electronic device at angular positions where the display surface of the supported electronic device faces a first side or faces a second side that is the opposite of the first side; and the number of angular positions at which the electronic device may be secured on the second side is the same as the number of angular positions at which the electronic device may be secured on the first side.

This configuration is convenient when the electronic device is used by different people facing each other.

In an electronic device support stand according to another aspect of the invention, the pivot mechanism secures the supported electronic device at angular positions where the display surface of the supported electronic device faces a first side or faces a second side that is the opposite of the first side; and the number of angular positions at which the electronic device may be secured on the second side is different from the number of angular positions at which the electronic device may be secured on the first side.

Further preferably, the pivot mechanism of the electronic device support stand has an operating lever that releases the electronic device when operated by the user, and secures the electronic device when not operated by the user.

This configuration improves user convenience.

An electronic device support stand according to another aspect of the invention has a holding unit configured to hold an electronic device; and a base unit that supports the holding unit. The holding unit includes a pivot mechanism enabling pivoting the holding unit around an axis parallel to the surface on which the base unit is placed; and the pivot mechanism includes a mechanism that causes a holding unit gear unit and a base unit gear unit to engage and secure the holding unit at a specific angular position, and holds the holding unit gear unit and the base unit gear unit in contact when in the secured position.

This configuration assures positive contact between engaged gear teeth when the holding unit supporting an electronic device is secured at a specific angle (angular position), and can therefore keep the electronic device from moving (wobbling) when operating the electronic device.

Preferably, the pivot mechanism has a pressure member that pushes the holding unit gear unit in an engagement direction, which is the direction of movement to engage the base unit gear unit, and the contact surfaces of the pressure member and the holding unit gear unit are inclined to the direction perpendicular to the engagement direction.

This configuration pushes the holding unit gear unit sufficiently in the engagement direction to the base unit gear unit, and can assure positive contact between mating gear parts.

In another aspect of the invention, the holding unit gear unit is shaped so that the side of the holding unit gear unit contacts the base unit gear unit before the distal end of the holding unit gear unit when moving in the engagement direction.

This configuration can assure continuous contact between the sides of mating teeth, and can reliably prevent movement of the electronic device when operating the electronic device.

Further preferably, the holding unit has an elastic member disposed between the holding unit and the base unit, the elastic member being compressed and applying torque to the holding unit when the holding unit is in a secured position.

This configuration can assure continuous contact between the sides of mating teeth, and can reliably prevent movement when operating the electronic device.

Another aspect of the invention is an electronic device support stand configured to hold an electronic device, and including: a top member that pushes against the top edge of the electronic device and can move vertically to the electronic device; and at least two bottom members that support the bottom edge of the electronic device and can move widthwise to the electronic device.

This configuration enables quickly gripping electronic devices of different sizes.

Preferably, the electronic device support stand also has a lock plate that is removably attachable to the electronic device; the distal end of the lock plate fitting into a fixed recess in the electronic device support stand when the electronic device to which the lock plate is attached is held.

This configuration can prevent theft of the supported electronic device.

Another aspect of the invention is an electronic device support stand including a holding unit that holds an electronic device; and a base unit that supports the holding unit. The holding unit has a pivot mechanism enabling the electronic device to pivot, and an opening through which a power cable of the electronic device guided from inside the base unit along the axis of rotation of the pivot mechanism passes to the outside.

Because the distance from the exit of the power cable to the outside of the electronic device support stand to the connector of the electronic device does not change with this configuration even when the supported electronic device is rotated by the pivot mechanism, the power cable will not be pulled.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 22 illustrates the holding unit gear unit 203A when pushed in.

DESCRIPTION OF EMBODIMENTS

Figure 1:
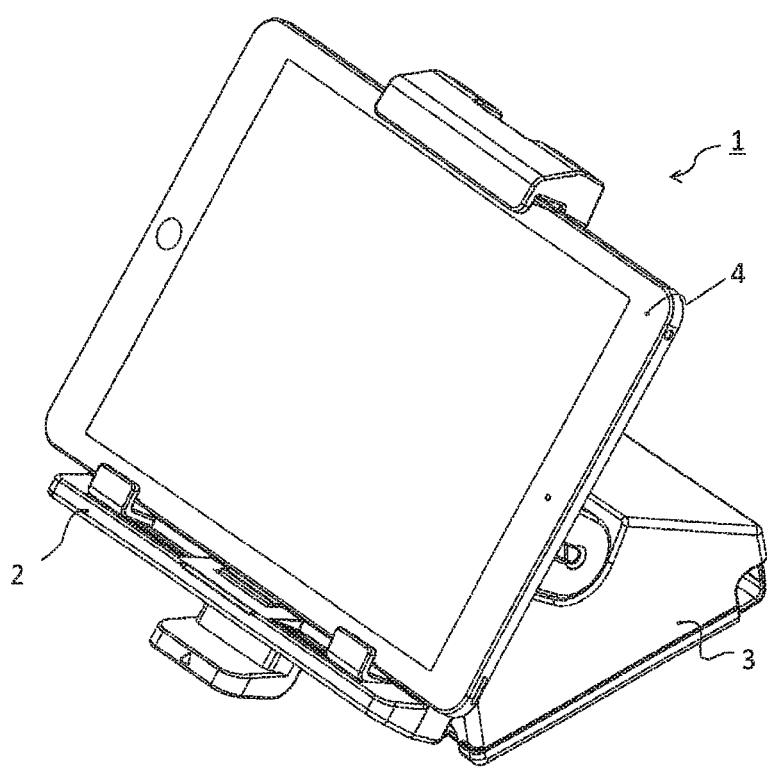
FIG. 1 is an oblique view of an electronic device support stand according to the invention.

An embodiment of the present invention is described below with reference to the accompanying figures. However, the embodiment described below does not limit the technical scope of the invention. Note that in the figures like or similar parts are identified by the same reference numerals or reference symbols.

Embodiment 1

FIG. 1 is an oblique view of a first example of an electronic device support stand according to the invention. The electronic device support stand 1 shown in FIG. 1 has a holding unit 2 that holds an electronic device 4; a base unit 3 that supports the holding unit 2; and a pivot mechanism 200 allowing the holding unit 2 to pivot with no load on a horizontal axis parallel to the installation surface on which the electronic device support stand 1 (base unit 3) is placed, and enabling securing the holding unit 2 in any of plural pivot positions by engagement of toothed parts. As a result, the held electronic device 4 can be pivoted with practically no force and secured reliably in a confined space.

Figure 2:
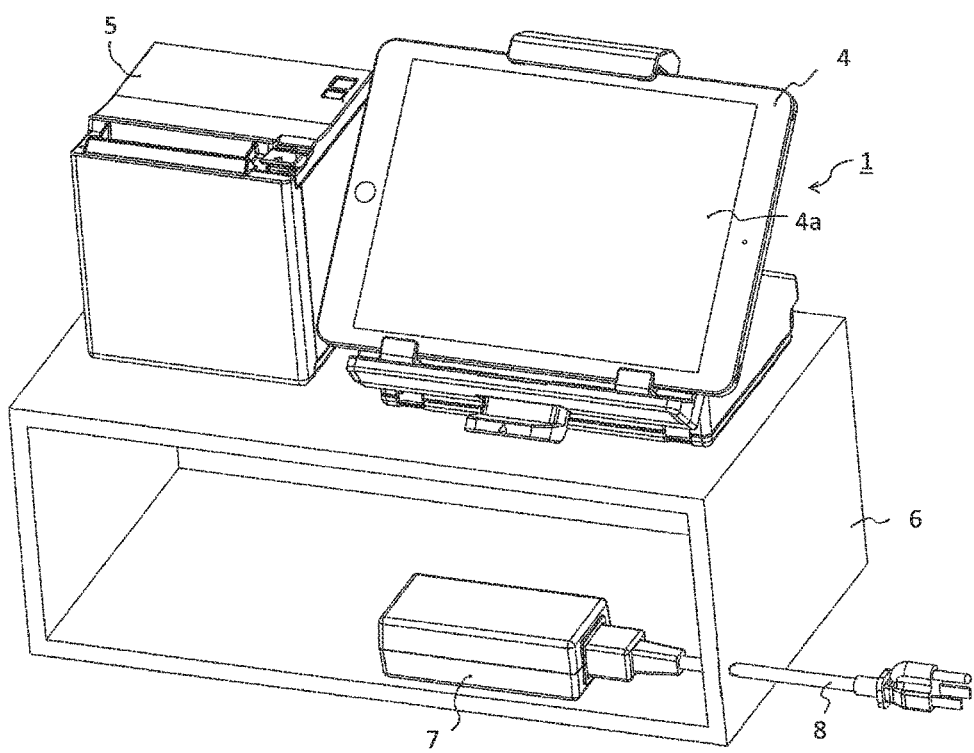
FIG. 2 shows an example of an electronic device support stand 1 in use.

FIG. 2 shows an example of the electronic device support stand 1 when in use. In the example in FIG. 2, the electronic device 4 is a tablet terminal used for processing sales transactions in a store, for example, and illustrates how a cash register system may be easily constructed using a common tablet terminal without introducing a dedicated POS system. The cash register system shown in this example includes a tablet terminal (electronic device 4), an electronic device support stand 1 according to this embodiment that supports the tablet terminal (electronic device 4), and a printer 5 for printing receipts and coupons. While not shown in the figures, a card reader (scanner) and other input devices may also be connected. As shown in FIG. 2, for example, this cash register system is disposed on top of an installation rack 6, and power is supplied through a power cord 8 connected to a power source, and an AC adapter 7. (Note that the cord from the AC adapter 7 to the downstream device(s) is not shown in FIG. 2.)

The electronic device 4 is a common tablet terminal (tablet computer), and can be operated by touching the display screen 4a. A checkout register application (an application for processing sales transactions) is installed on the electronic device 4, and the operator starts this application to execute a transaction process.

The electronic device support stand 1 is a stand (platform, bracket, or apparatus for supporting a device) that holds the electronic device 4, and holds the electronic device 4 as shown in FIG. 2 in this example. The electronic device support stand 1 holds (secures) the electronic device 4 pivotably by means of the pivot mechanism 200 described below, and when customer operation is required to authorize a transaction during the transaction process, for example, enables pivoting the display screen 4a of the electronic device 4 to face the customer (the back side of the electronic device 4 in the view shown in FIG. 2).

The printer 5 is a printing device that prints receipts related to the transaction process as controlled by instructions from the electronic device 4 (checkout register application).

Figure 3:
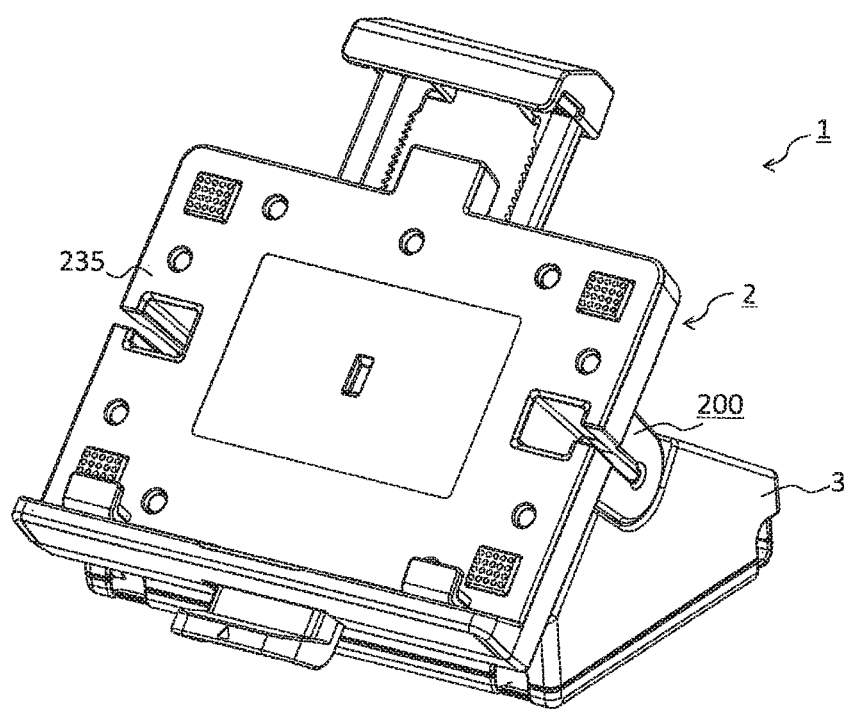
FIG. 3 is an oblique view of the electronic device support stand 1 when not supporting an electronic device 4.

FIG. 3 is an oblique view of the electronic device support stand 1 when not holding the electronic device 4. The electronic device support stand 1 has a holding unit 2 that secures and holds the electronic device 4 in a specific orientation, and a base unit 3 that supports the holding unit 2.

The holding unit 2 includes a support panel 235 on which the electronic device 4 is held, the pivot mechanism 200 enabling the electronic device 4 to pivot, a slider for securing the electronic device 4, a bottom arm, cushioning, and a through-hole for passing a power supply cable to the electronic device 4.

The base unit 3 is the bottom section of the electronic device support stand 1, and the bottom of the base unit 3 rests on the surface on which the electronic device support stand 1 is placed. As described further below, the base unit 3 has a power supply unit disposed inside, and the power cable from the power supply unit is guided through the above power cable through-hole to the electronic device 4.

The electronic device support stand 1 according to this embodiment of the invention is characterized by the pivot mechanism 200 described further below.

The pivot mechanism 200 of this electronic device support stand 1 is a mechanism for pivoting the supported electronic device 4 on an axis parallel to the surface on which the electronic device support stand 1 is placed; allows the electronic device 4 to pivot with substantially no load when the operator pivots the electronic device 4; and can hold the electronic device 4 firmly at any of plural specific angles of rotation (angular positions).

Figure 4:
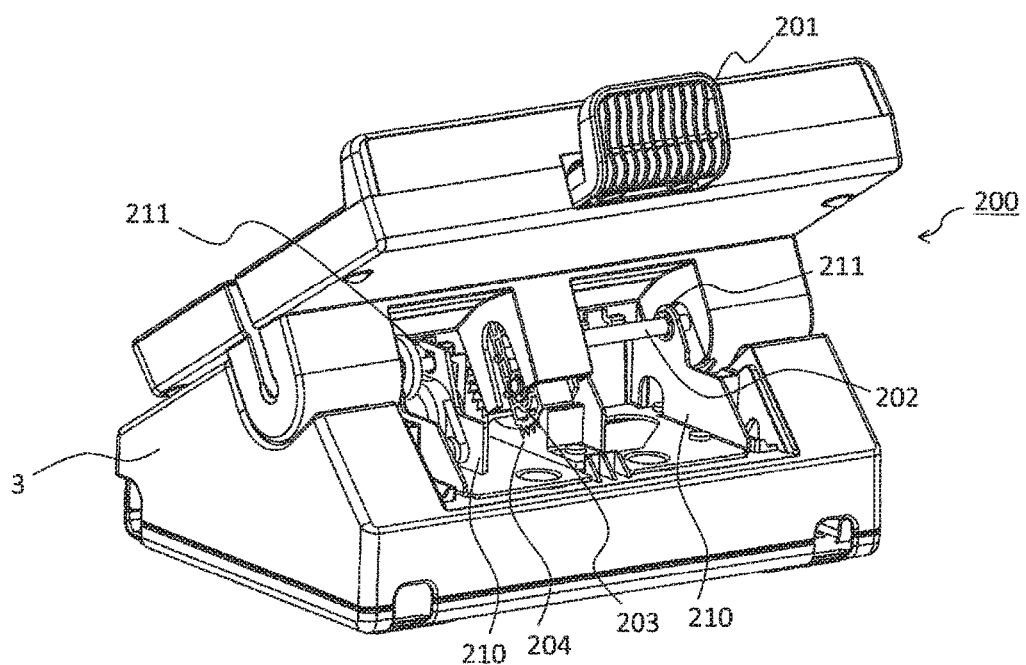
FIG. 4 is an oblique view showing an example of the pivot mechanism 200.

FIG. 4 is an oblique view of the pivot mechanism 200. The shaft 202 shown in FIG. 4 is the pivot axis of the holding unit 2, and is disposed parallel to the installation surface of the electronic device support stand 1 described above. The shaft 202 is supported by two support members 210 fastened to the base unit 3. The support members 210 each have a bearing 211 where the shaft 202 is supported, and the bearings 211 allow the shaft 202 to rotate with substantially no load.

A holding unit gear unit 203 is attached to the shaft 202 so that it cannot rotate on the shaft 202. A base unit gear unit 204 is disposed in a stationary position on the base unit 3. A bottom protrusion 203b is disposed to the bottom distal end of the holding unit gear unit 203, a recess is disposed in the top surface of the base unit gear unit 204, and the shaft 202, or more specifically the holding unit 2, is held securely and unable to pivot when the bottom protrusion 203b engages the recessed portion of the base unit gear unit 204.

The pivot lever 201 (operating lever) shown in FIG. 4 is the part that is operated by the user (operator) to pivot the holding unit 2, or more specifically the electronic device 4.

Figure 5:
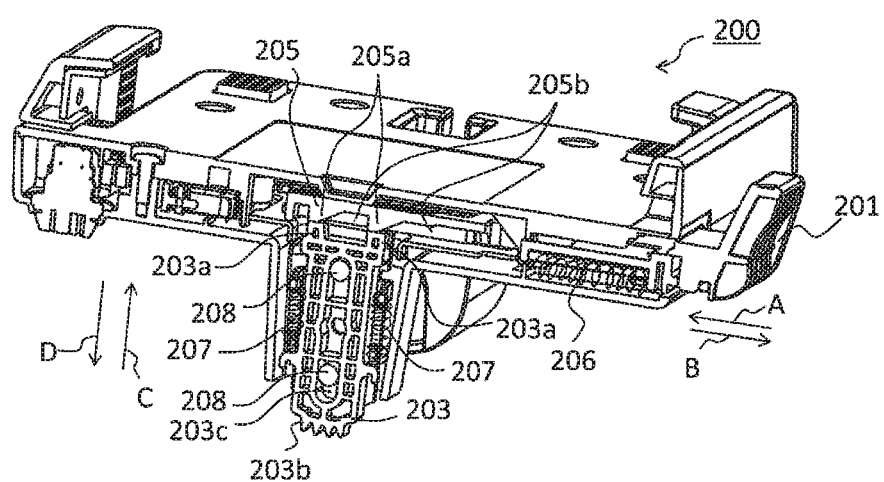
FIG. 5 is a section view of the pivot mechanism 200.

FIG. 5 is a section view of the pivot mechanism 200. FIG. 5 is a section view through a plane perpendicular to the shaft 202. As shown in FIG. 5, there is a top protrusion at each side of the top end of the holding unit gear unit 203 described above. A gear spring 207 is also disposed to each side of the holding unit gear unit 203, and the holding unit gear unit 203 is constantly urged up (in the direction of arrow C in FIG. 5) by the force of these gear springs 207. A movement channel 203c is formed in the center of the holding unit gear unit 203, and the holding unit gear unit 203 moves vertically (moves in the directions of arrows C and D in FIG. 5) along two vertical poles 208 fastened to the base unit 3.

As shown in FIG. 5, the pivot lever 201 is connected to a lever-side pusher 205. When the user (operator) pushes on the pivot lever 201 and the pivot lever 201 therefore moves toward the holding unit gear unit 203 (in the direction of arrow A in FIG. 5), the lever-side pusher 205 moves with movement of the pivot lever 201 in the same direction. A lever spring 206 is also disposed to the lever-side pusher 205, which constantly urges the pivot lever 201 and lever-side pusher 205 in the direction away from the holding unit gear unit 203 (in the direction of arrow B in FIG. 5).

As shown in FIG. 5, when the pivot lever 201 is not operated, the two protrusions 205a of the lever-side pusher 205 respectively contact the top protrusions 203a of the holding unit gear unit 203, and the lever-side pusher 205 pushes the holding unit gear unit 203 down (in the direction of arrow D in FIG. 5) against the urging force of the gear springs 207. At this position the bottom protrusion 203b of the holding unit gear unit 203 fits into the recess of the base unit gear unit 204, and the shaft 202, that is, the holding unit 2 and electronic device 4, is held fixed and unable to pivot.

When the pivot lever 201 is operated and depressed (moved in the direction of arrow A in FIG. 5), the protrusions 205a and top protrusions 203a disengage, and the recesses 205b in the lever-side pusher 205 move to the locations of the top protrusions 203a. As a result, the holding unit gear unit 203 rises due to the urging force of the gear springs 207 (moves in the direction of arrow C in FIG. 5), the bottom protrusion 203b and the recess of the base unit gear unit 204 disengage, and the holding unit 2 and electronic device 4 can therefore pivot.

The principle described above allows the holding unit 2 and electronic device 4 to pivot and be fixed in a specific position. In this example, the holding unit 2 and electronic device 4 can be secured in any of four pivot positions (angles of rotation). More specifically, the holding unit 2 and electronic device 4 can be locked in three positions on the side allowing the operator to view the display screen 4a of the electronic device (operating side, first side), and one position on the side allowing the customer to view the display screen 4a (operating side, second side).

Figure 6:
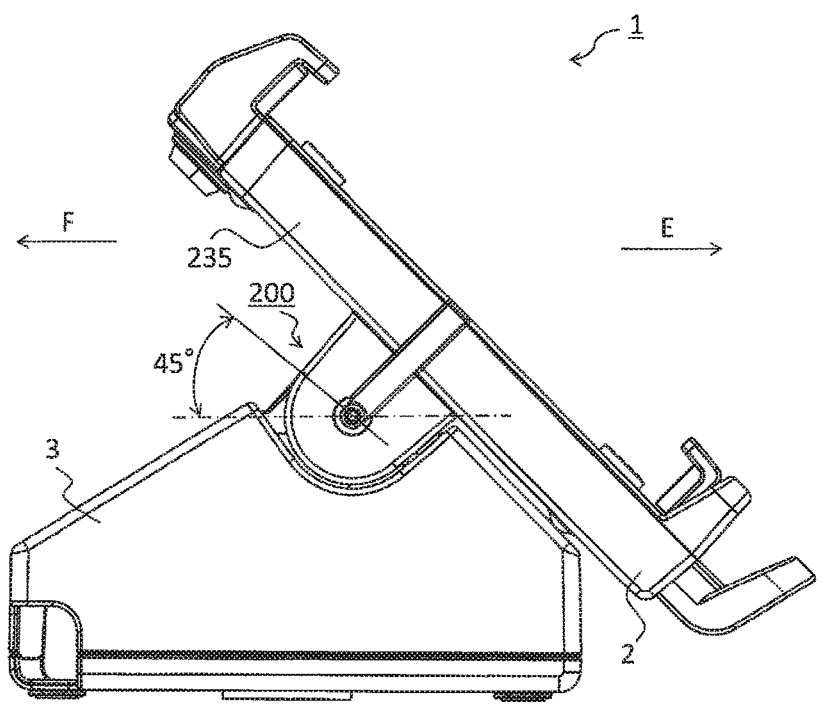
FIG. 6 is a side view of the holding unit 2 when fixed in a first position.

FIG. 6 is a side view of the holding unit 2 when fixed in the first position. The first position is an angular position at which the display screen 4a faces the operator (in the direction of arrow E in FIG. 6) with a 45 degree angle between the installation surface and the support panel 235 as shown in FIG. 6.

Figure 7:
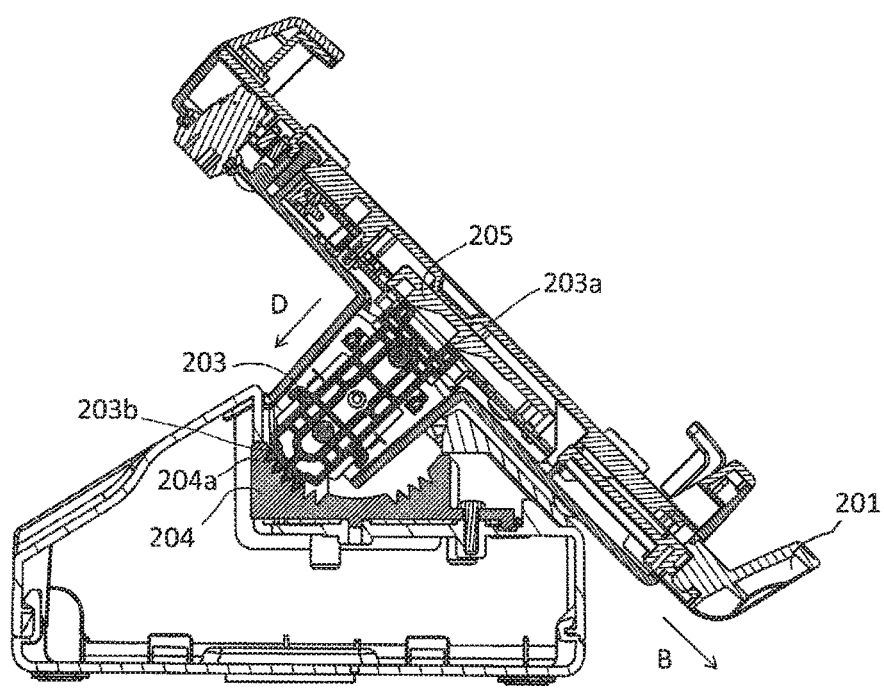
FIG. 7 is a section view of the holding unit 2 when fixed in a first position.

FIG. 7 is a section view of the holding unit 2 when fixed in the first position. Because the holding unit 2 is fixed in the first position when held as shown in FIG. 7, the pivot lever 201 has moved in the direction away from the holding unit gear unit 203 (in the direction of arrow B in FIG. 7). The protrusions 205a of the lever-side pusher 205 are in contact with the top protrusions 203a of the holding unit gear unit 203, the lever-side pusher 205 is pushed down (in the direction of arrow D in FIG. 7), and the bottom protrusion 203b of the holding unit gear unit 203 is fit into the recess of the base unit gear unit 204. In this first position, the bottom protrusion 203b is engaged from the left-most recess 204a as seen in FIG. 7.

Figure 8:
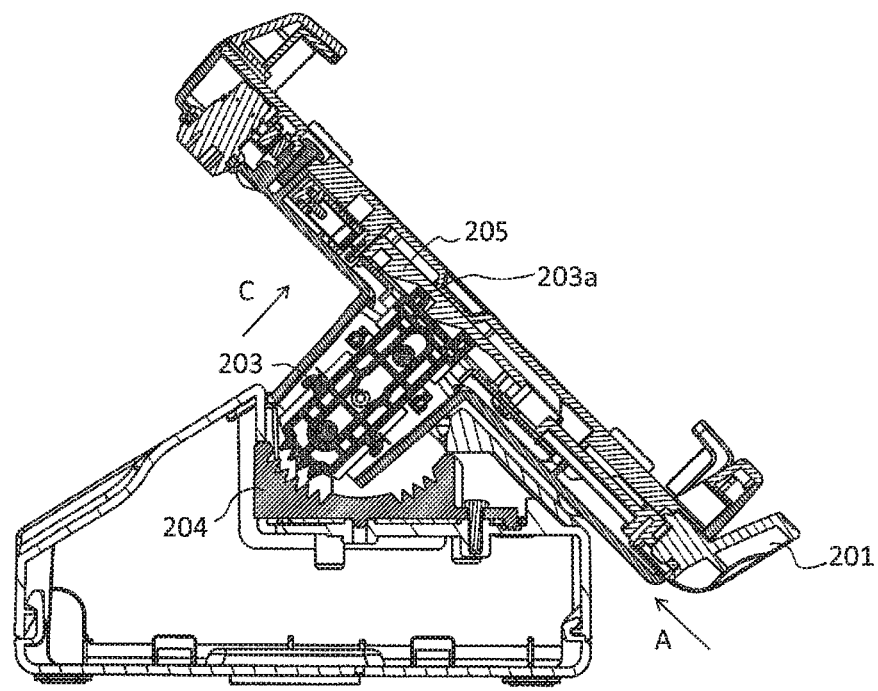
FIG. 8 is a section view of the holding unit 2 when the pivot lever 201 is operated in the first position.

FIG. 8 is a section view of the holding unit 2 when the pivot lever 201 is operated from the first position. As described above, when the pivot lever 201 is operated and depressed (moves in the direction of arrow A in FIG. 8), the protrusions 205a and top protrusions 203a disengage, the holding unit gear unit 203 rises (moves in the direction of arrow C in FIG. 8), the bottom protrusion 203b and recess of the base unit gear unit 204 disengage, and the holding unit 2 can pivot freely. The operator can therefore change the position (orientation) by rotating the holding unit 2 and then releasing the pivot lever 201 at the desired pivot position.

Figure 9:
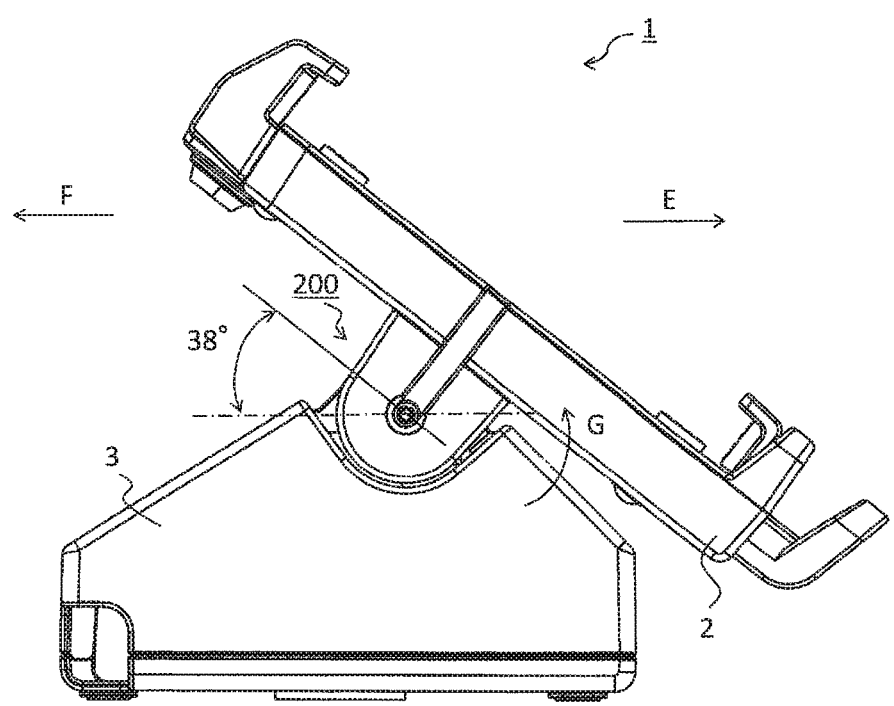
FIG. 9 is a side view of the holding unit 2 when fixed in a second position.

FIG. 9 is a side view of the holding unit 2 when fixed in the second position. The second position is an angular position at which the display screen 4a faces the operator (in the direction of arrow E in FIG. 9) with a 38 degree angle between the installation surface and the support panel 235 as shown in FIG. 9.

Figure 10:
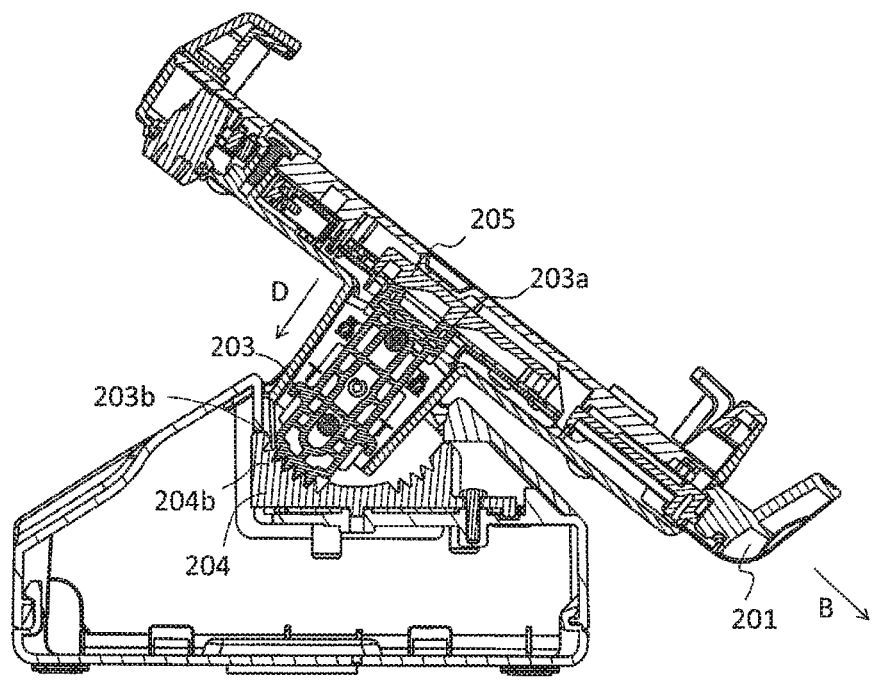
FIG. 10 is a section view of the holding unit 2 when fixed in a second position.

FIG. 10 is a section view of the holding unit 2 when fixed in the second position. Because the holding unit 2 is fixed in the second position when held as shown in FIG. 10, the pivot lever 201 has moved in the direction away from the holding unit gear unit 203 (in the direction of arrow B in FIG. 10). The protrusions 205a of the lever-side pusher 205 are in contact with the top protrusions 203a of the holding unit gear unit 203, the lever-side pusher 205 is pushed down (in the direction of arrow D in FIG. 10), and the bottom protrusion 203b of the holding unit gear unit 203 is fit into the recess of the base unit gear unit 204. In this second position, the bottom protrusion 203b is engaged from the second recess 204b from the left as seen in FIG. 10.

Figure 11:
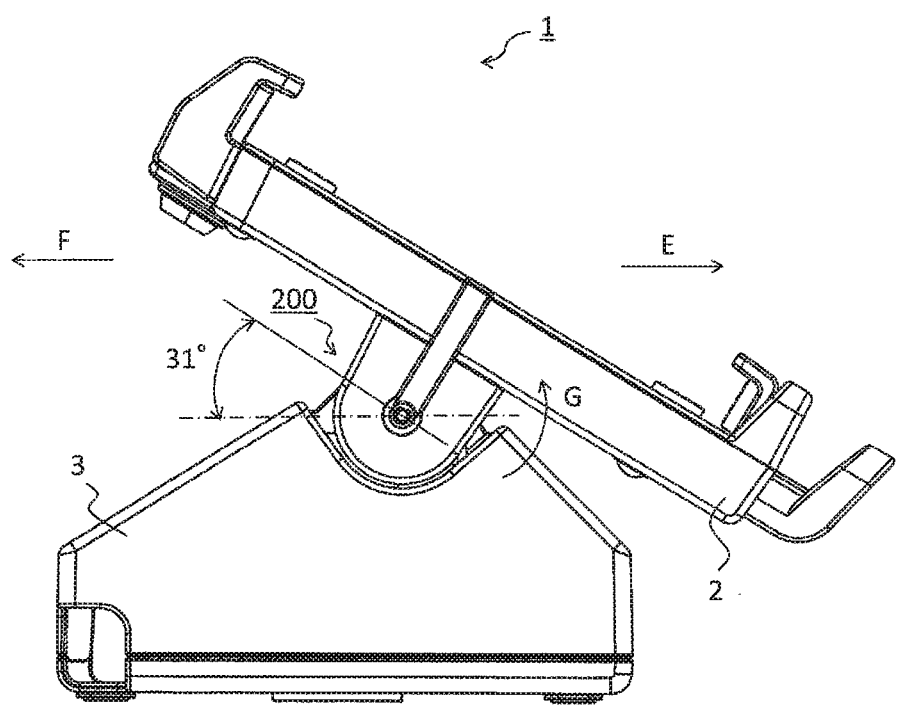
FIG. 11 is a side view of the holding unit 2 when fixed in a third position.

FIG. 11 is a side view of the holding unit 2 when fixed in the third position. The third position is an angular position at which the display screen 4a faces the operator (in the direction of arrow E in FIG. 11) with a 31 degree angle between the installation surface and the support panel 235 as shown in FIG. 11.

Figure 12:
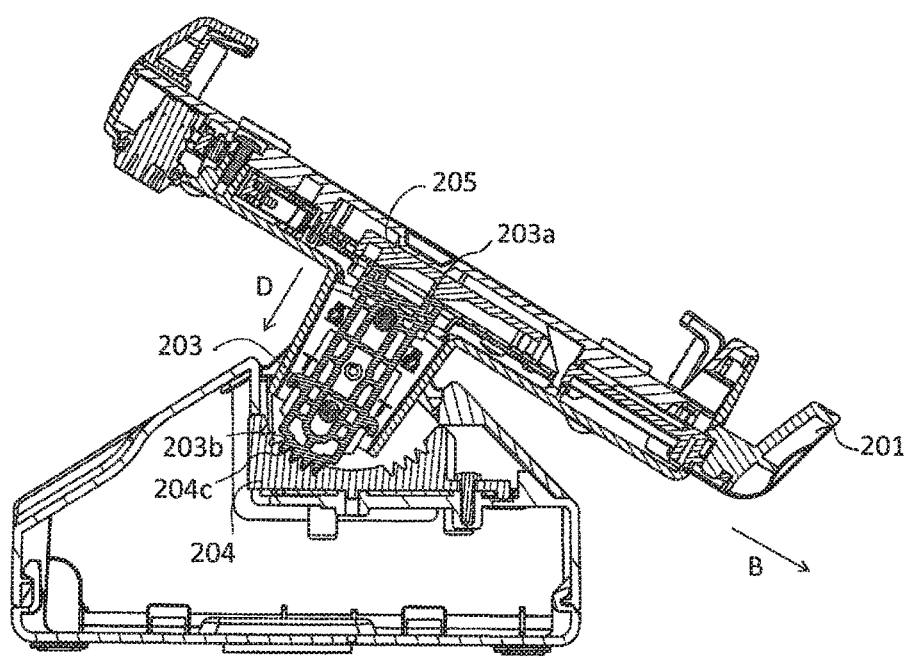
FIG. 12 is a section view of the holding unit 2 when fixed in a third position.

FIG. 12 is a section view of the holding unit 2 when fixed in the third position. Because the holding unit 2 is fixed in the third position when held as shown in FIG. 12, the pivot lever 201 has moved in the direction away from the holding unit gear unit 203 (in the direction of arrow B in FIG. 12).

The protrusions 205a of the lever-side pusher 205 are in contact with the top protrusions 203a of the holding unit gear unit 203, the lever-side pusher 205 is pushed down (in the direction of arrow D in FIG. 12), and the bottom protrusion 203b of the holding unit gear unit 203 is fit into the recess of the base unit gear unit 204. In this third position, the bottom protrusion 203b is engaged from the third recess 204c from the left as seen in FIG. 12.

Figure 13:
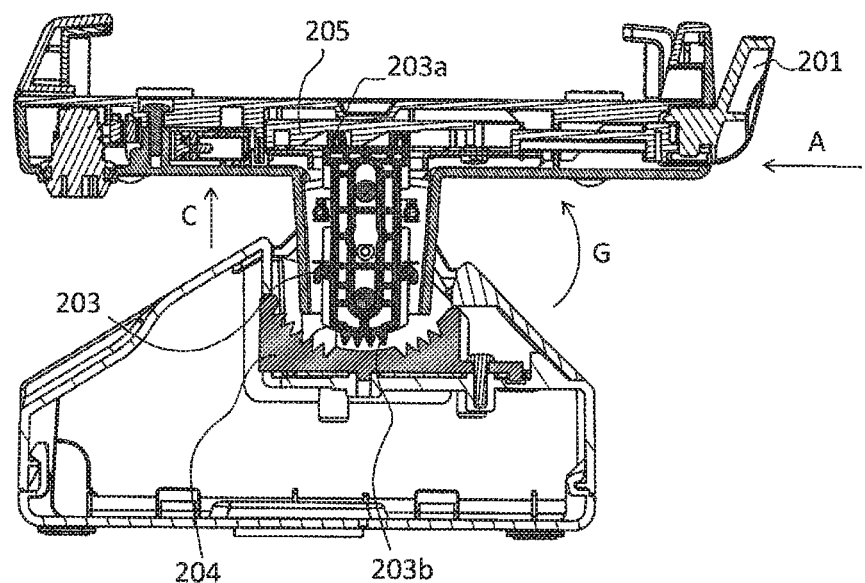
FIG. 13 is a section view of the holding unit 2 when moving from the third position to the fourth position.

FIG. 13 is a side view of the holding unit 2 when moving from the third position to the fourth position. As shown in FIG. 13, when pivoting, the pivot lever 201 is depressed (moved in the direction of arrow A in FIG. 13), the protrusions 205a and top protrusions 203a are disengaged, the holding unit gear unit 203 rises (moves in the direction of arrow C in FIG. 13), and the bottom protrusion 203b is disengaged from the recesses of the base unit gear unit 204.

Figure 14:
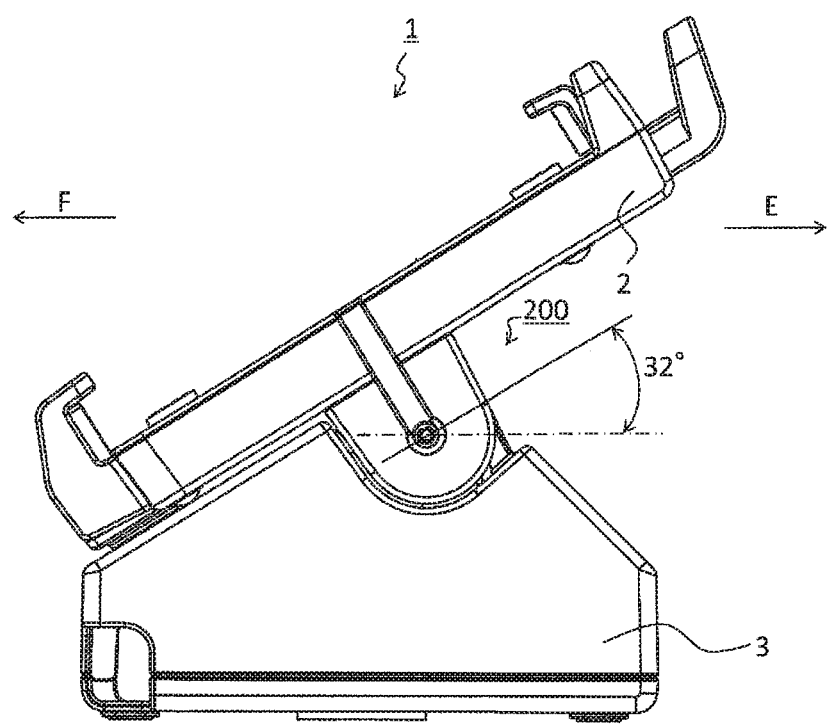
FIG. 14 is a side view of the holding unit 2 when fixed in a fourth position.

FIG. 14 is a side view of the holding unit 2 when fixed in the fourth position. The fourth position is an angular position at which the display screen 4a faces the customer (in the direction of arrow F in FIG. 14) with a 32 degree angle between the installation surface and the support panel 235 as shown in FIG. 14.

Figure 15:
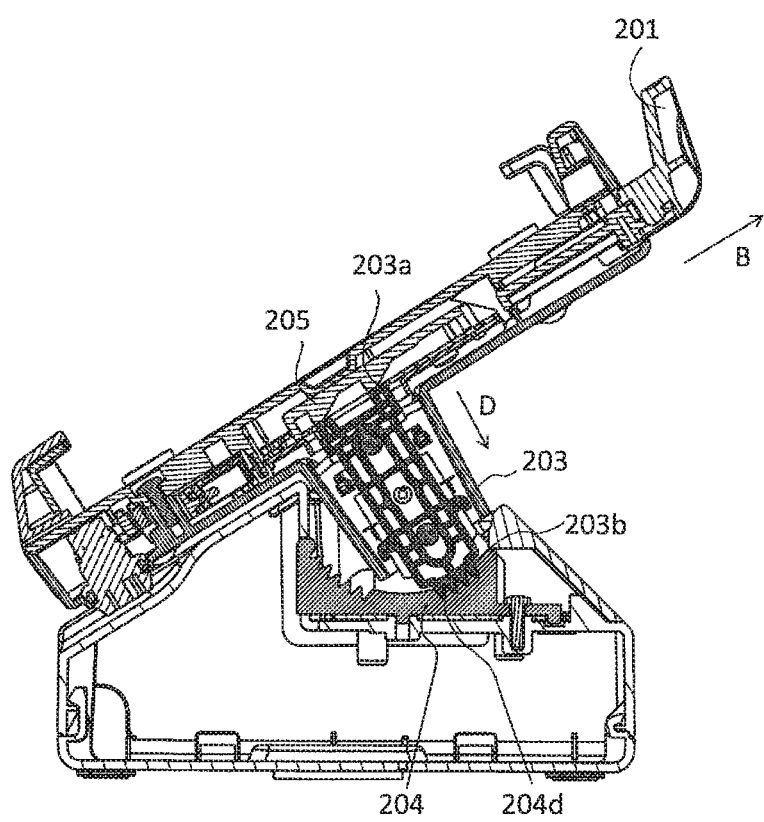
FIG. 15 is a section view of the holding unit 2 when fixed in a fourth position.

FIG. 15 is a section view of the holding unit 2 when fixed in the fourth position. Because the holding unit 2 is fixed in the fourth position when held as shown in FIG. 15, the pivot lever 201 has moved in the direction away from the holding unit gear unit 203 (in the direction of arrow B in FIG. 15). The protrusions 205a of the lever-side pusher 205 are in contact with the top protrusions 203a of the holding unit gear unit 203, the lever-side pusher 205 is pushed down (in the direction of arrow D in FIG. 15), and the bottom protrusion 203b of the holding unit gear unit 203 is fit into the recess of the base unit gear unit 204. In this fourth position, the bottom protrusion 203b is engaged from the fourth recess 204d from the right as seen in FIG. 15.

In the example described above, the holding unit 2 can be fixed in four different positions, but the number and angles of the positions in which the holding unit 2 may be fixed may differ from those described herein. The holding unit 2 may also be fixed in a different number of positions on the operator and customer sides as in the foregoing example, but the holding unit 2 may be fixed in the same number of positions on the operator and customer sides. In this case, the display screen 4a may also pivot between a single fixed position facing the operator and a single fixed position facing the customer. In this configuration, the angle between the installation surface and the support panel 235 may be the same 45 degrees when the display screen 4a is pivoted to the operator and when the display screen 4a is pivoted to the customer, for example.

As described above, because the pivot mechanism 200 of the electronic device support stand 1 rotates the supported electronic device 4 on an axis of rotation parallel to the installation surface, the display screen 4a of the electronic device 4 can be changed to the operator side and the customer side without requiring additional space.

Furthermore, because pivoting is possible with substantially no load, the operator can quickly switch the orientation of the electronic device 4 with a light touch.

Furthermore, because the holding unit 2 is secured by engaged teeth when rotated to the desired position, the electronic device 4 can be held securely, and the operator and customer can easily perform operations on the display screen 4a.

Furthermore, because the electronic device 4 can be secured in multiple angular positions, user convenience is excellent.

Note that to further stabilize pivoting the holding unit 2, a low load rotary damper may be disposed to the shaft 202.

Embodiment 2

Figure 16:
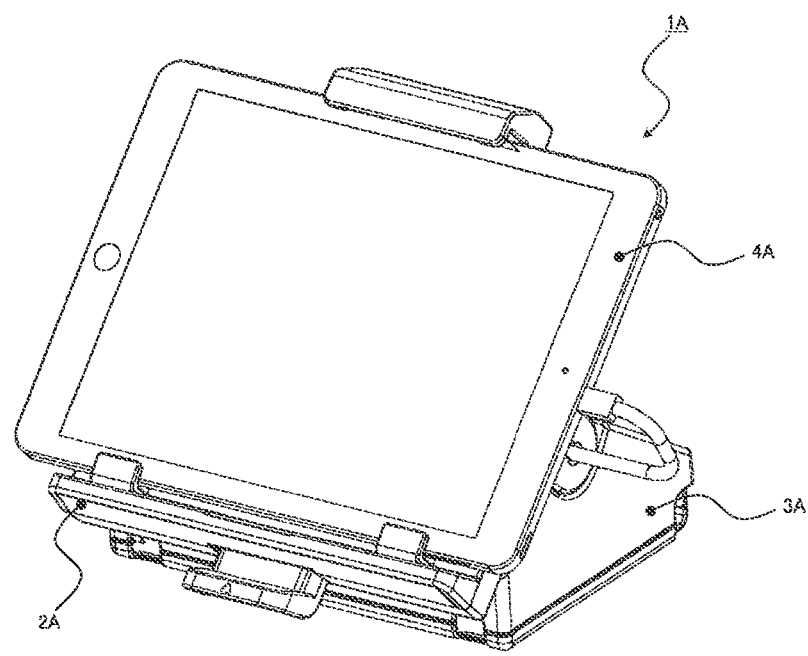
FIG. 16 is an oblique view of an electronic device support stand according to the invention according to a second embodiment of the invention.

FIG. 16 is an oblique view of an electronic device support stand according to a second embodiment of the invention. Similarly to the electronic device support stand 1 according to the first embodiment of the invention, the electronic device support stand 1A according to the embodiment shown in FIG. 2 has a holding unit 2A that holds an electronic device 4A; a base unit 3A that supports the holding unit 2A; and a pivot mechanism 200A allowing the holding unit 2A to pivot with no load on a horizontal axis parallel to the installation surface on which the electronic device support stand 1A (base unit 3A) is placed, and enabling securing the holding unit 2A in any of plural pivot positions by engagement of toothed parts. The electronic device support stand 1 also has a mechanism for causing positive contact between engaged teeth when the position is locked by the gear units engaging. As a result, the electronic device support stand 1A according to this embodiment allows the held electronic device 4A to pivot with practically no force and be secured reliably in a confined space.

The electronic device support stand 1A according to the second embodiment of the invention is used in the same way as the electronic device support stand 1 of the first embodiment of the invention, and is configured identically to the electronic device support stand 1 of the first embodiment except for the dimensions of some parts and details of the pivot mechanism 200A described below (a mechanism for suppressing movement when performing operations on the electronic device 4A). The differences between the pivot mechanism 200A of the electronic device support stand 1A according to this embodiment and the pivot mechanism 200 of the electronic device support stand 1 according to the first embodiment of the invention are therefore described below.

Figure 17:
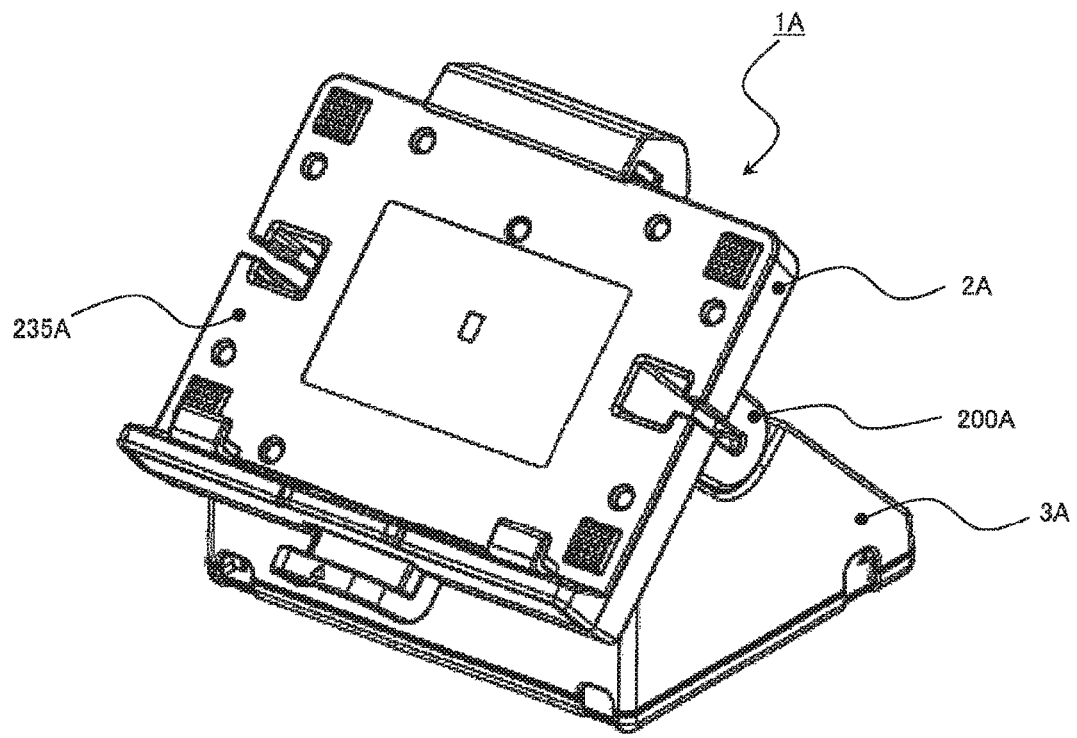
FIG. 17 is an oblique view of the electronic device support stand 1A when not supporting an electronic device 4A.
Figure 18:
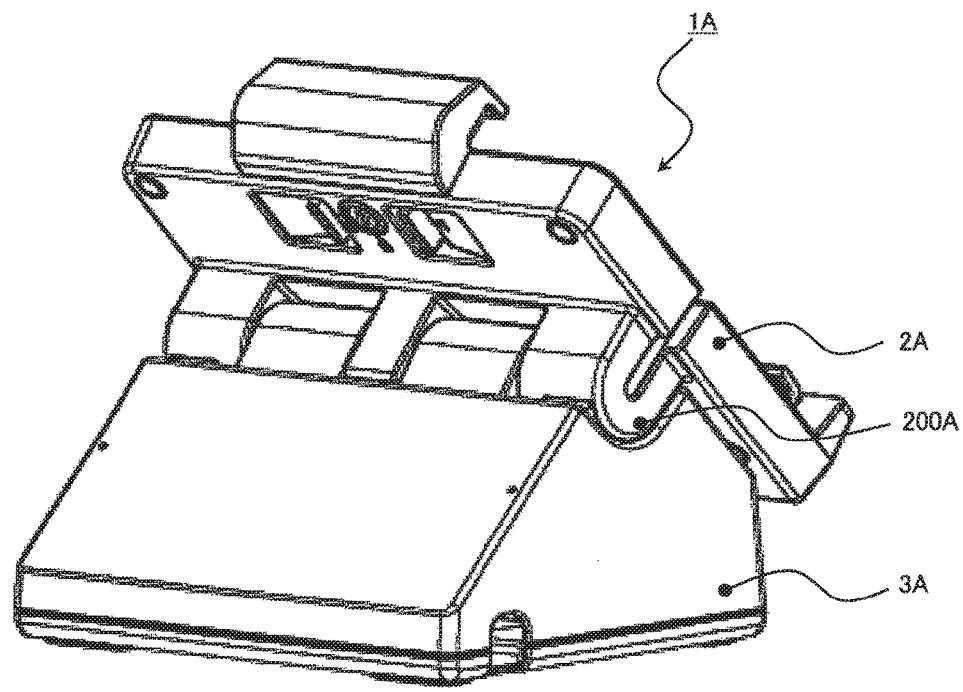
FIG. 18 is an oblique view of the electronic device support stand 1A when not supporting the electronic device 4A.

FIG. 17 and FIG. 18 are oblique views of the electronic device support stand 1A when not holding the electronic device 4A. The electronic device support stand 1A has a holding unit 2A that secures and holds the electronic device 4A in a specific orientation, and a base unit 3A that supports the holding unit 2A.

The holding unit 2A includes a support panel 235A on which the electronic device 4A is held, the pivot mechanism 200A enabling the electronic device 4A to pivot, a slider for securing the electronic device 4A, a bottom arm, cushioning, and a through-hole for passing a power supply cable to the electronic device 4A.

In the electronic device support stand 1 in the first embodiment described above there is a design tolerance Ga in the engagement of the holding unit gear unit 203 and base unit gear unit 204 of the pivot mechanism 200.

Figure 19:
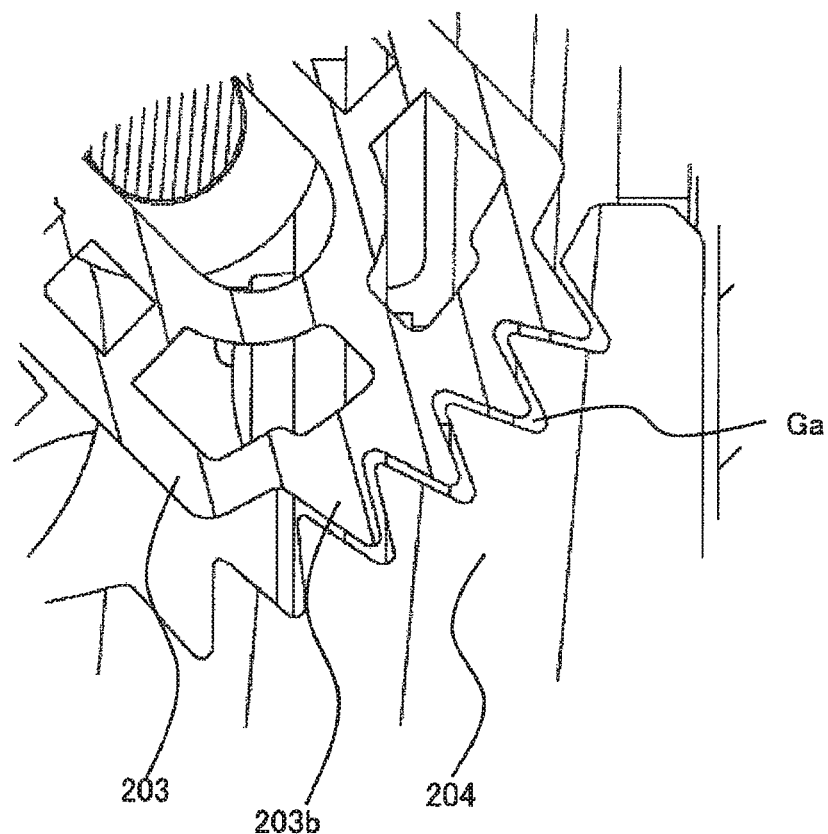
FIG. 19 illustrates an example of the tolerance between the holding unit gear unit 203 and the base unit gear unit 204.

FIG. 19 shows an example of this tolerance. FIG. 19 is an enlarged view showing where the bottom protrusion 203b of the holding unit gear unit 203 engages the recesses in the base unit gear unit 204. As shown in the figure, there is a tolerance Ga in the engagement of the holding unit gear unit 203 and base unit gear unit 204.

Tests shows that when there is such a tolerance Ga and the operator pushes against the electronic device 4 held in the holding unit 2 (touches the display surface), the holding unit 2 can move until the sides of the bottom protrusion 203b of the holding unit gear unit 203 contact the sides of the recesses in the base unit gear unit 204, and the electronic device 4 can therefore rotate the amount of this tolerance Ga.

More specifically, there is some amount of movement (play) in the electronic device 4 when operating the electronic device 4.

To eliminate this movement, the electronic device support stand 1A according to this embodiment has a mechanism that causes the bottom protrusion 203bA of the holding unit gear unit 203A to positively contact (engage) the recesses of the base unit gear unit 204A when the holding unit gear unit 203A and base unit gear unit 204A are engaged. This is the difference with the pivot mechanism 200 of the electronic device support stand 1 according to the first embodiment of the invention, and the three configurations described below may be used as this mechanism.

In one configuration the contact surfaces (contact faces) between the protrusions 205aA of the lever-side pusher 205A (pressure member) and the top protrusions 203aA of the holding unit gear unit 203A are inclined to the direction in which the lever-side pusher 205A pushes the holding unit gear unit 203A (the direction of engagement between the holding unit gear unit 203A and the base unit gear unit 204A, in the direction of arrow D in FIG. 7 (referred to below as the engagement direction)); and considering tolerances, the length in the engagement direction of the lever-side pusher 205A and the holding unit gear unit 203A is a length enabling the bottom protrusion 203bA of the holding unit gear unit 203A to engage (contact) the recesses in the base unit gear unit 204A when engaging.

Figure 20:
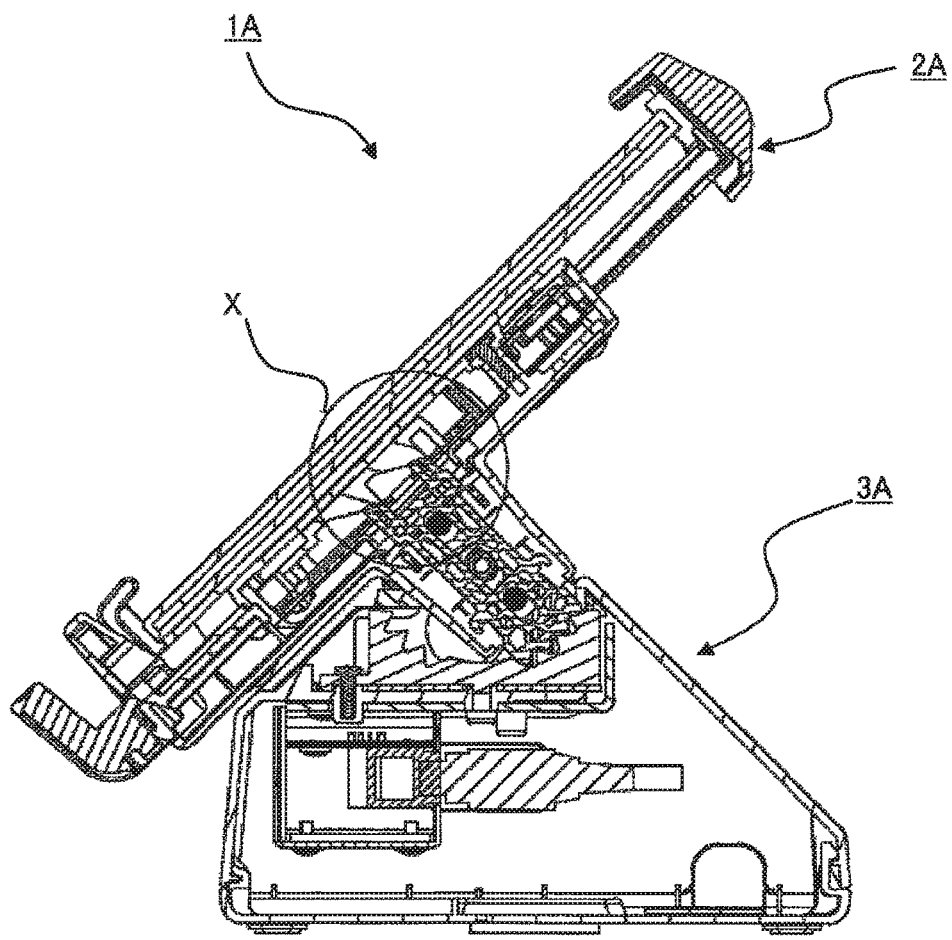
FIG. 20 is a side section view of the electronic device support stand 1A.
Figure 21:
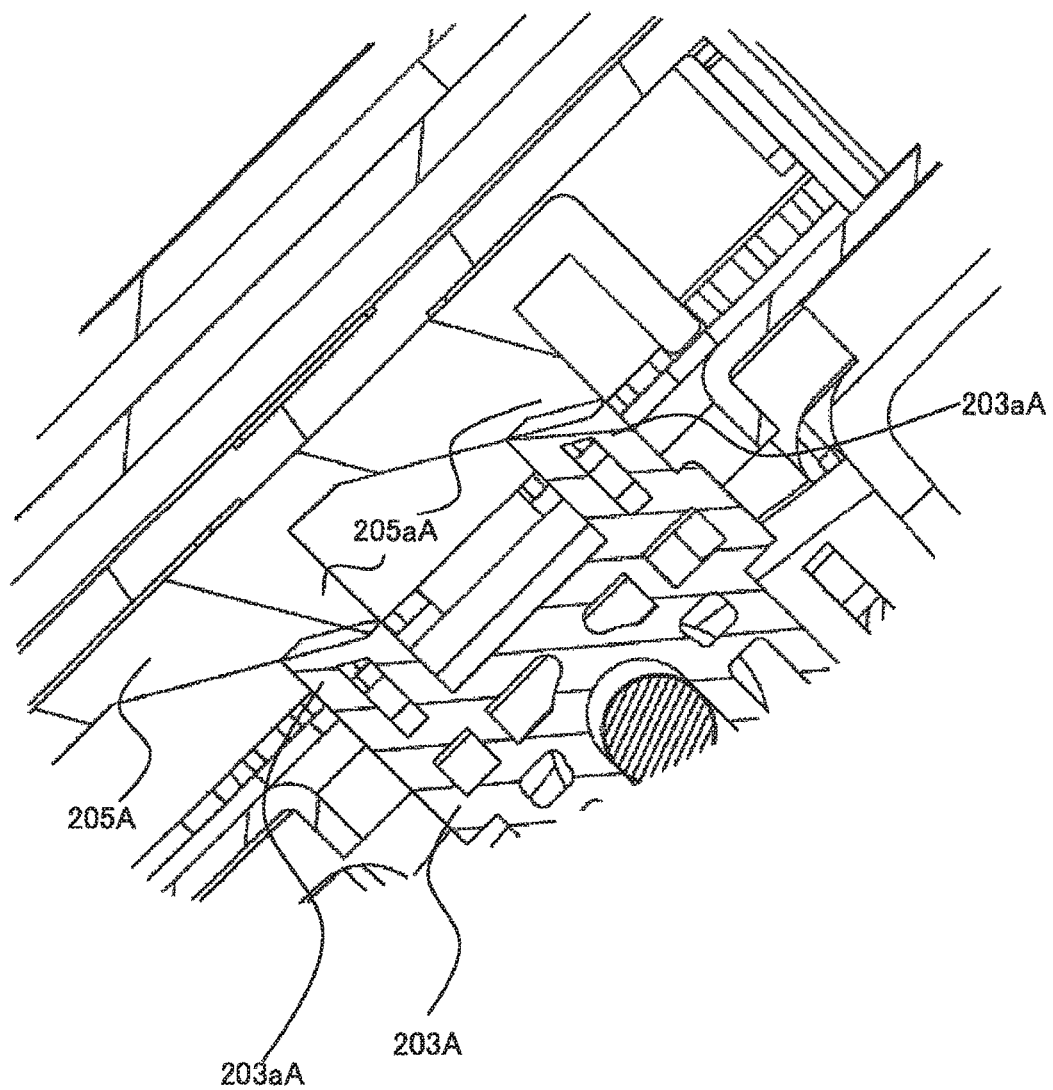
FIG. 21 illustrates contact between the lever-side pusher 205A and the holding unit gear unit 203A.

FIG. 20 is a side section view of the electronic device support stand 1A. FIG. 21 illustrates contact between the lever-side pusher 205A and the holding unit gear unit 203A. FIG. 21 is an enlarged view of area A in FIG. 20.

The contact surfaces of the lever-side pusher 205 and holding unit gear unit 203 in the first embodiment are substantially perpendicular to the engagement direction, but are at an angle to this perpendicular in the electronic device support stand 1A according to the invention as shown in FIG. 21. As long as the actual dimension is within tolerances when the holding unit gear unit 203A and base unit gear unit 204A are engaged, the length of the engagement direction of the lever-side pusher 205A and holding unit gear unit 203A is a dimension allowing the protrusions 205aA of the lever-side pusher 205A and the top protrusions 203aA of the holding unit gear unit 203A to overlap as shown in FIG. 21 so that the bottom protrusion 203bA of the holding unit gear unit 203A always contacts (engages) the recesses in the base unit gear unit 204A.

As long as the actual dimension of the engagement direction of the lever-side pusher 205A and the holding unit gear unit 203A is within tolerances, this configuration causes the bottom protrusion 203bA of the holding unit gear unit 203A and the recesses of the base unit gear unit 204A to mate (engage) when the holding unit gear unit 203A and base unit gear unit 204A engage, and because the contact face of the lever-side pusher 205A is inclined to the contact face of the holding unit gear unit 203A, the lever-side pusher 205A moves perpendicularly to the engagement direction according to this actual dimension without the holding unit gear unit 203A and the base unit gear unit 204A seizing.

Figure 22:
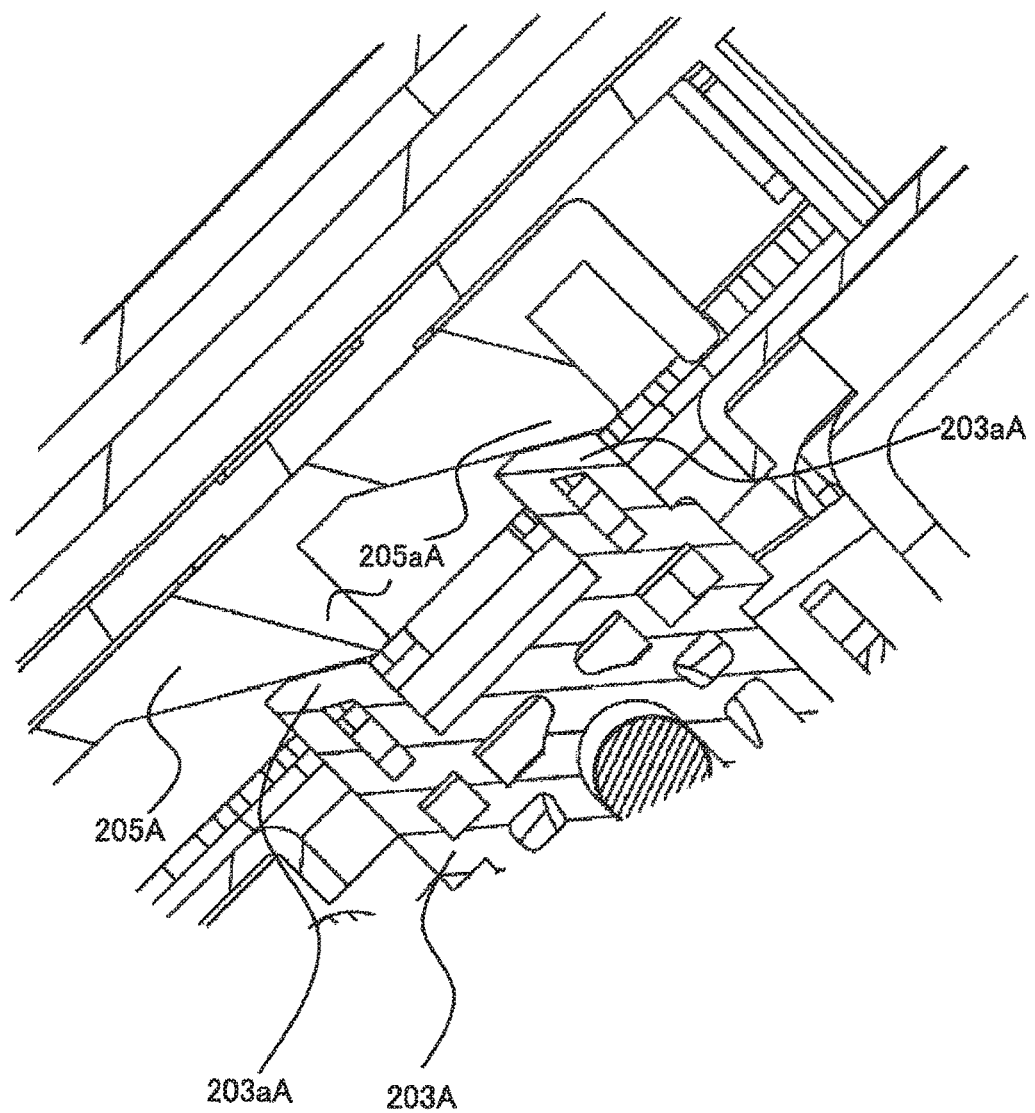

FIG. 22 illustrates after the above movement stops. Because the bottom protrusion 203bA of the holding unit gear unit 203A and the recesses of the base unit gear unit 204A are always touching (engaged), and the amount that the electronic device 4 can move when operations are performed on the electronic device 4A is extremely small, this configuration can suppress movement and play when operating the electronic device 4A.

The second configuration disposes an elastic member 240A to the back of the holding unit 2A. The elastic member 240A is disposed to apply a moment of inertia to the holding unit 2A so that a side of the bottom protrusion 203bA of the holding unit gear unit 203A contacts (engages) a side of the recesses of the base unit gear unit 204A when the holding unit gear unit 203A and base unit gear unit 204A are engaged.

Figure 23A:
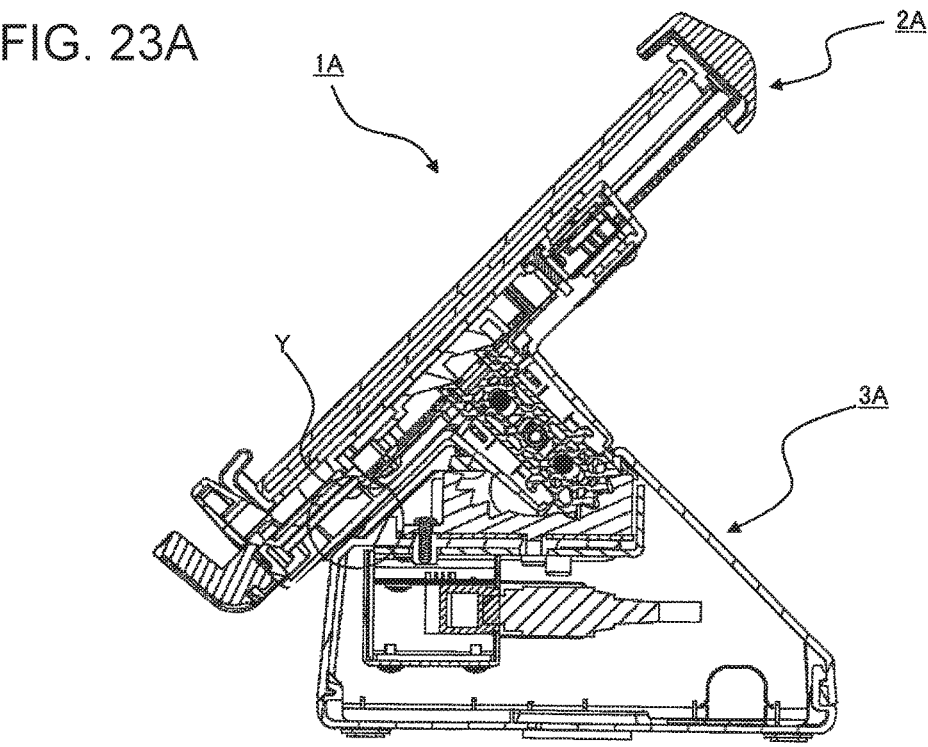
FIG. 23A and FIG. 23B illustrate an elastic member 240A.
Figure 23B:
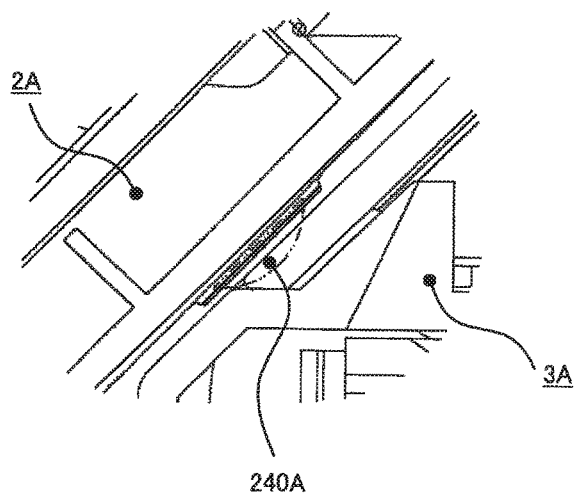

FIGS. 23A and 23B are used to describe the elastic member 240A. FIG. 23A is a side section view of the electronic device support stand 1A, and the elastic member 240A is disposed in area Y. More specifically, the elastic member 240A is disposed to a position that is between the holding unit 2A and the base unit 3A when the holding unit gear unit 203A and base unit gear unit 204A are engaged.

FIG. 23B is an enlarged view of area Y in FIG. 23A. As shown in FIG. 23B, the elastic member 240A is disposed to the back of the holding unit 2A, and is sized to overlap the base unit 3A side when the holding unit gear unit 203A and base unit gear unit 204A are engaged.

When the holding unit 2A is rotated by the pivot mechanism 200A and the holding unit gear unit 203A and the base unit gear unit 204A engage, the elastic member 240A of the above dimension is squeezed and compresses slightly in the gap to the base unit 3A, and the holding unit gear unit 203A and base unit gear unit 204A are thereby fixed in a specific position.

After the holding unit gear unit 203A and the base unit gear unit 204A are thus engaged, the elastic member 240A tries to decompress and pushes the holding unit 2A away from the base unit 3A. This causes the holding unit 2A to rotate slightly around the shaft 202A (not shown in the figure), and this rotation causes the bottom protrusion 203bA side of the holding unit gear unit 203A to contact (engage) the sides of the recesses of the base unit gear unit 204A.

Figure 24:
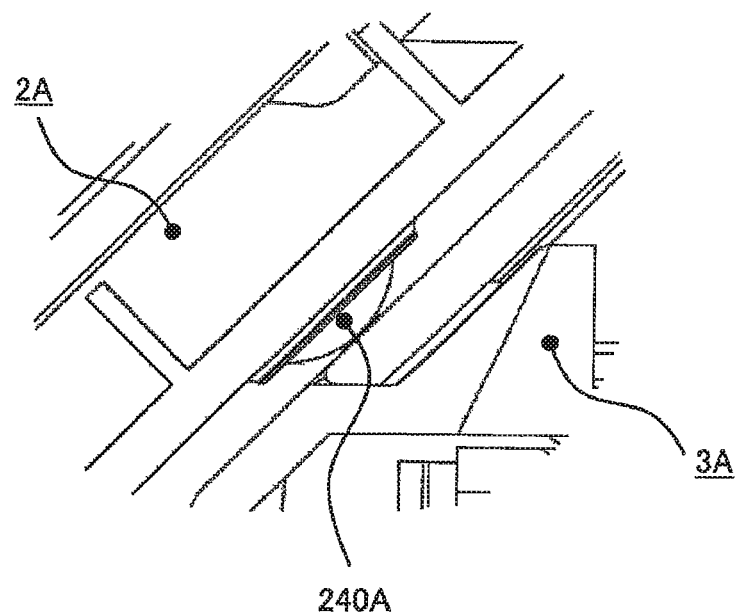
FIG. 24 illustrates the elastic member 240A.

FIG. 24 shows an example of the elastic member 240A in the decompressed state. In this state, the force urging the elastic member 240A in to the original dimension applies a moment of inertia around the shaft 202A to the holding unit 2A.

Figure 25:
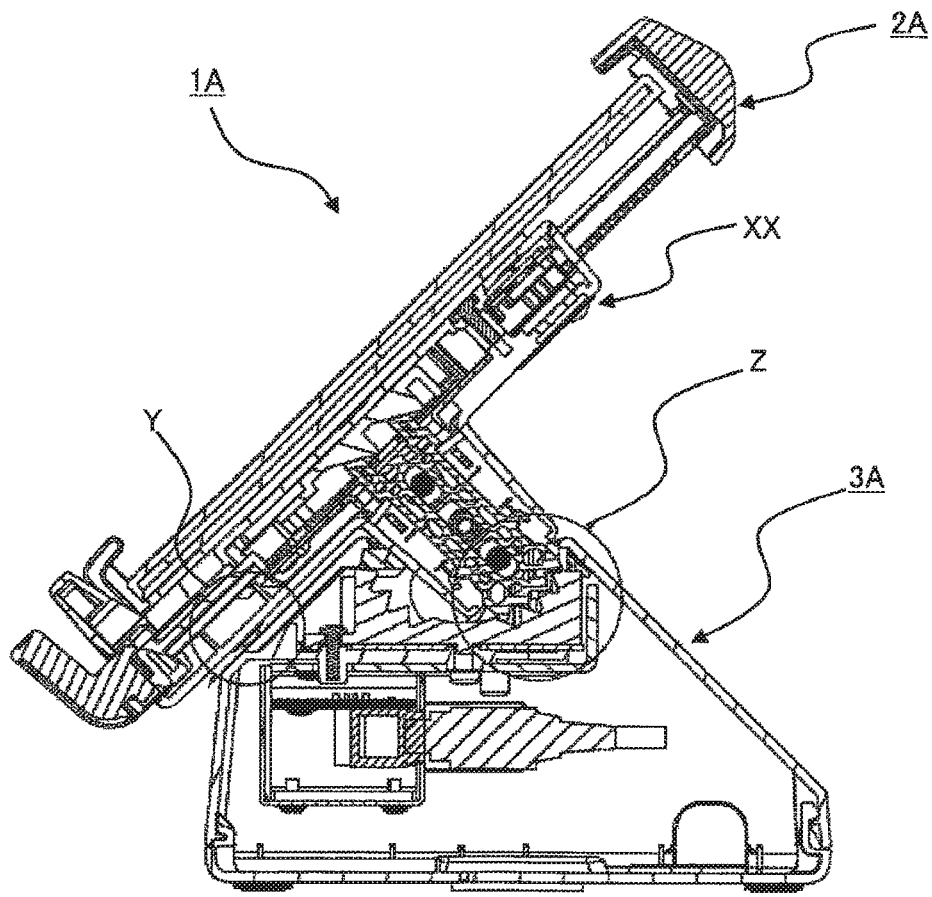
FIG. 25 is a side section view of the electronic device support stand 1A.
Figure 26:
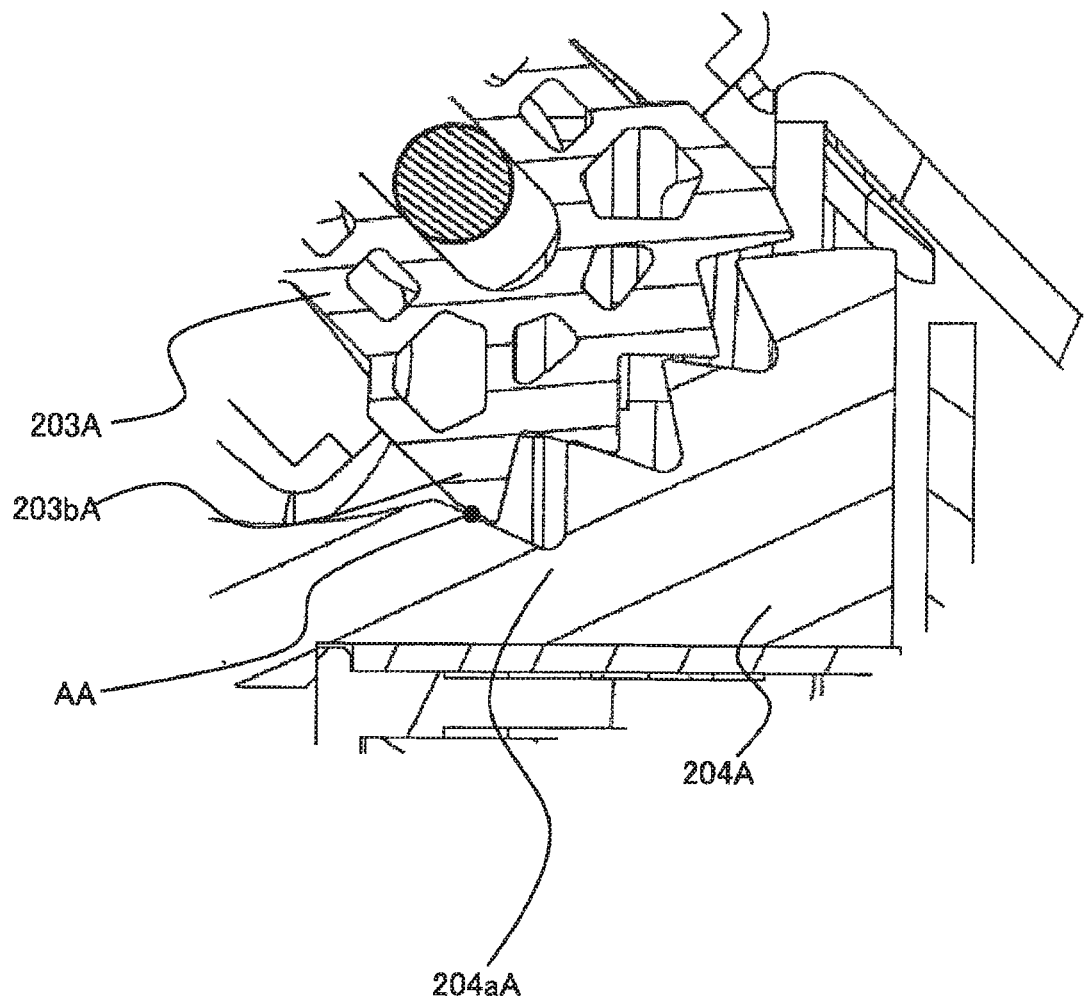
FIG. 26 is an enlarged view of area Z in FIG. 25.

FIG. 25 is a side section view of the electronic device support stand 1A in this embodiment. FIG. 26 is an enlarged view of area Z in FIG. 25. FIG. 25 and FIG. 26 illustrate when a moment of inertia is applied by the elastic member 240A. As described above, in this state the sides of the bottom protrusion 203bA of the holding unit gear unit 203A are contacting (engaging) the sides of the recesses 204aA of the recess 204a (such as area AA in FIG. 26). This moment of inertia forces the sides of the bottom protrusion 203bA against the sides of the recesses 204aA.

Because the moment of inertia produced by the elastic member 240A pushes the sides of the bottom protrusion 203bA against the sides of the recesses 204aA when the holding unit gear unit 203A and the base unit gear unit 204A engage, the holding unit 2A does not wobble easily, and this second configuration can eliminate play when the electronic device 4A is operated.

An elastic member 240A is preferably also disposed to the holding unit 2A at opposite end of the back (the position indicated by XX in FIG. 25). This other elastic member 240A has the same function when the holding unit 2A is at a different angular position.

This second configuration may be used in conjunction with the above first configuration, or independently of the above first configuration.

The third configuration changes the shape of the bottom protrusion of the holding unit gear unit in the first configuration described above. More specifically, this shape causes the sides of the bottom protrusion and the sides of the recesses to contact when the bottom protrusion of the holding unit gear unit engages the recesses of the base unit gear unit.

Figure 27:
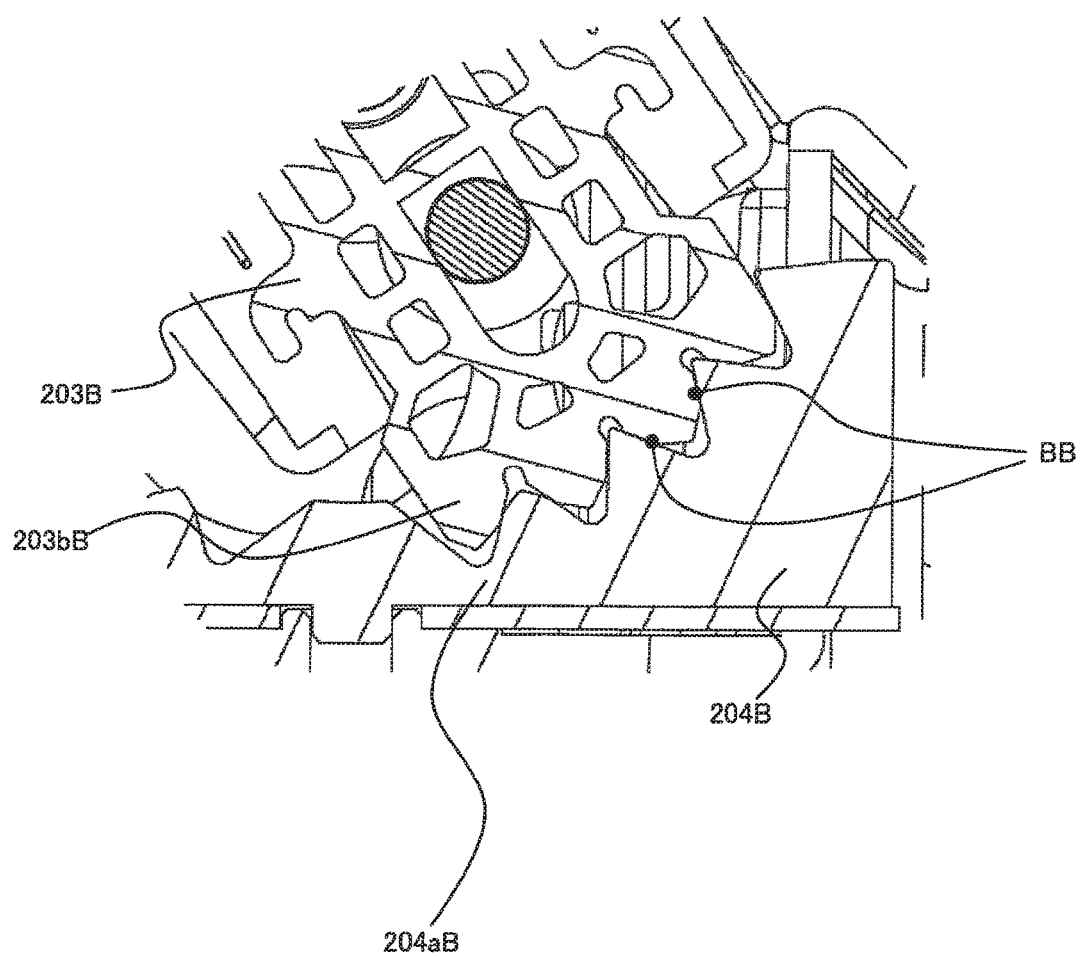
FIG. 27 illustrates contact between a holding unit gear unit 203B and a base unit gear unit 204B.

FIG. 27 illustrates contact between the holding unit gear unit 203B and the base unit gear 204B. In the example in FIG. 27, the bottom protrusion 203bB of the holding unit gear unit 203B is shaped like a top, and when the bottom protrusion 203bB of the holding unit gear unit 203B approaches a recess 204aB of the base unit gear 204B in the engagement direction, the side of the bottom protrusion 203bB contacts the side of the recess 204aB before the peak (top land) and valley (bottom land) make contact (FIG. 27, BB).

Because the bottom protrusion 203bB and recess 204aB always make contact in the first configuration described above when the holding unit gear unit 203B and base unit gear 204B engage, both sides of the bottom protrusion 203bB contact the sides of the recess 204aB with no gap therebetween, and there is no play when operating the electronic device 4A.

Note that the shape of the bottom protrusion 203bB shown in FIG. 27 is simply one example, and any shape that has the same effect may be used.

As described above, the electronic device support stand 1A according to the second embodiment of the invention has a mechanism that assures positive contact between engaged gear parts when a holding unit 2A holding an electronic device 4A is fixed at a specific angle, and can suppress movement (wobbling) when operating the electronic device 4A.

Because the mechanism for making contact is configured to push the holding unit gear unit 203B sufficiently in the direction engaging the base unit gear 204B, positive contact between mating teeth can be assured.

By forming the teeth of the holding unit gear unit 203B as shown in FIG. 27 in this case, positive contact between mating teeth can be assured and movement (wobbling) can be reliably prevented.

Positive contact between mating teeth can also be assured and movement (wobbling) can be reliably prevented by using an elastic member 240A as described above as the mechanism assuring positive contact.

Other Mechanisms

Figure 28:
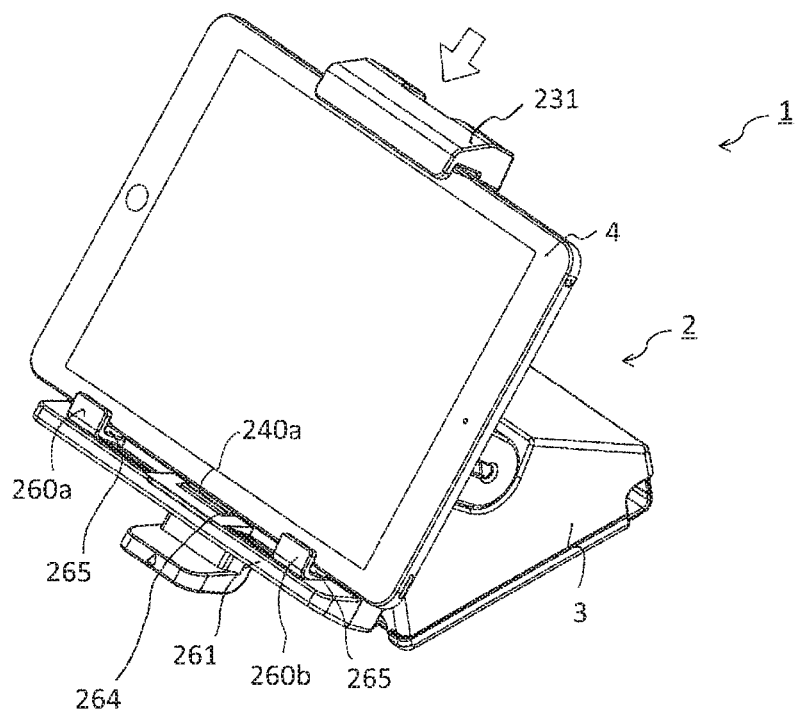
FIG. 28 is an oblique view of an electronic device support stand 1 supporting the electronic device 4.

The electronic device support stand 1 in the first embodiment described above has a lock mechanism to fasten the supported electronic device 4 securely and prevent theft of the electronic device 4. FIG. 28 is an oblique view of the electronic device support stand 1 when holding an electronic device 4. The lock mechanism of the electronic device support stand 1 comprises a slider including a top hook 231, bottom arms 260a, 260b, cushioning 265, and a lock plate 240.

The slider is described first. The slider is a mechanism for vertically moving the top hook 231 that pushes down on the top of the supported electronic device 4, and fastening the top hook 231 securely in a desired position. To prevent theft, there is also a mechanism for locking vertical movement of the top hook 231.

The bottom arms 260a, 260b are described next. As shown in FIG. 28, the bottom arms 260a, 260b on the left and right sides of the top of the bottom panel 261 of the holding unit 2. The bottom arms 260a, 260b are members that support the left and right sides of the bottom of the supported electronic device 4, and are attached to the support panel 235 so that they can move independently left and right (widthwise to the supported electronic device 4) along the top of the bottom panel 261. Electronic devices 4 can therefore be supported at desirable positions appropriate to the size and specifications of the supported electronic device 4.

Figure 29:
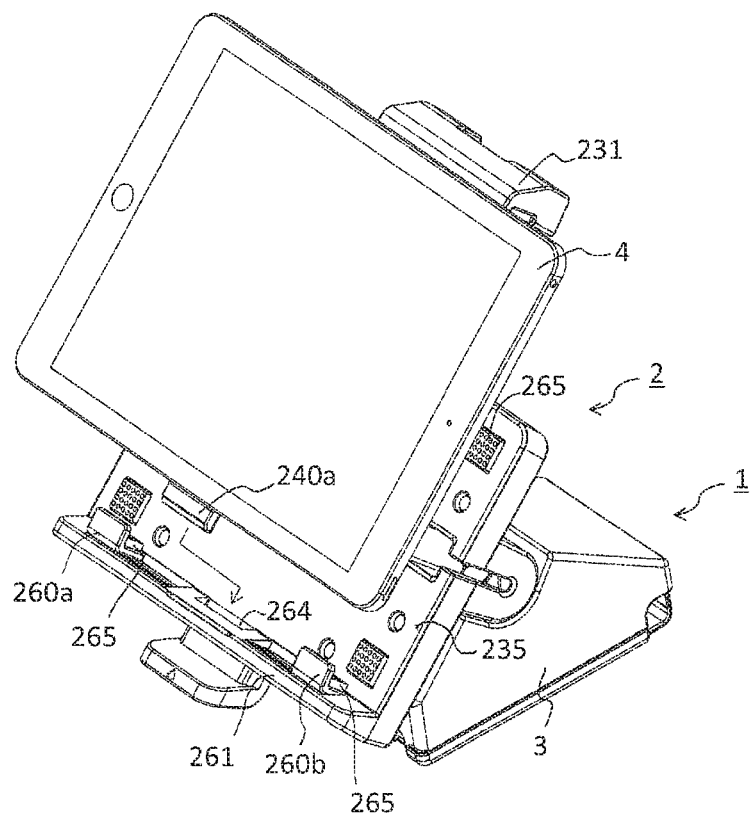
FIG. 29 illustrates securing the electronic device 4 with a lock plate 240.

The lock plate 240 is described next. FIG. 29 illustrates securing the electronic device 4 with the lock plate 240. The lock plate 240 is a flat member affixed to the supported electronic device 4. When an electronic device 4 is held by the electronic device support stand 1, the distal end part of the lock plate 240 is engaged with the holding unit 2 so that the electronic device 4 cannot be easily removed.

Next, the electronic device 4 is placed on the support panel 235 of the holding unit 2 while inserting the distal end 240*a* of the lock plate 240 into a lock plate receiver 264 (a stationary recess) disposed in the top of the bottom panel 261 as shown in FIG. 29. The bottom arms 260*a*, 260*b* are slid (moved) to the appropriate positions before or after the electronic device 4 is installed.

Because the electronic device support stand 1 holds the electronic device 4 at the top and bottom between a slider 230 with a top hook 231 and two bottom arms 260*a*, 260*b* as described above, the electronic device 4 can be firmly secured.

Cushioning 265 is also disposed to the surfaces of the top hook 231 and bottom arms 260*a*, 260*b* where the electronic device 4 is held, and can be firmly secured so that the electronic device 4 does not move in any direction. This also makes it easier for the operator and customer to operate the electronic device 4.

The electronic device 4 is also firmly secured by engaging the recesses and protrusions of the bottom arms 260*a*, 260*b* and bottom panel 261.

Furthermore, the lock plate 240 also prevents removing the electronic device 4 once the electronic device 4 is installed, and can prevent theft of the electronic device 4. Yet further, because the lock plate 240 is configured to be removably attachable to the electronic device 4, it can be affixed as desired to the electronic device 4, and where the electronic device 4 is held can be adjusted desirably to the application.

Furthermore, because the two bottom arms 260*a*, 260*b* are movable and can be adjusted to electronic devices 4 of various sizes and designs, the electronic device support stand 1 according to the invention can hold and support a wide variety of electronic devices 4.

Another feature of the electronic device support stand 1 according to the first embodiment of the invention is a construction for storing and guiding a power cable, for example, to where it is connected for use.

Figure 30:
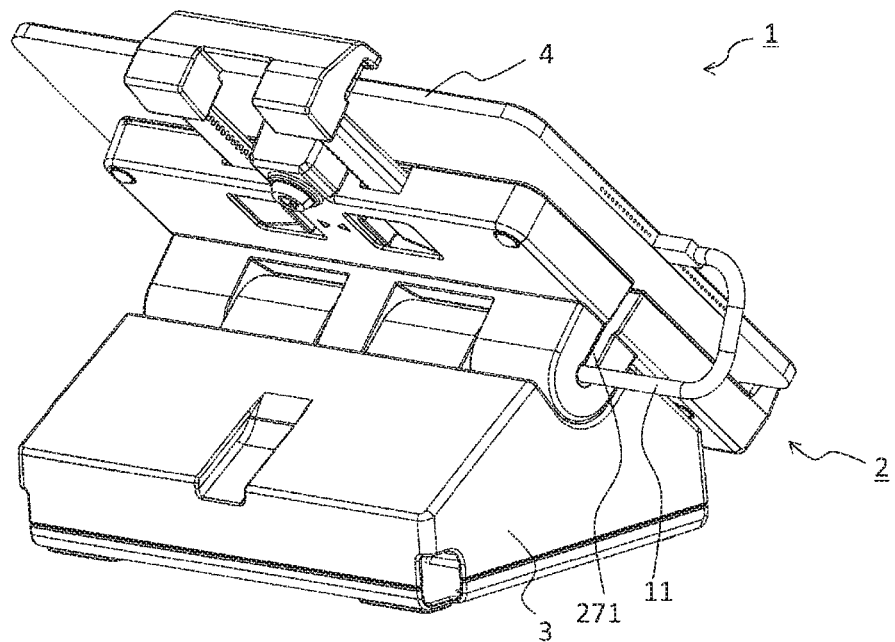
FIG. 30 is an oblique view illustrating connection of an electronic device cable 11.

FIG. 30 is an oblique view illustrating connection of an electronic device cable 11. In this example, power (24 V and 5 V) is supplied from a power outlet through a power cord and an AC adapter to a power supply unit disposed inside the base unit 3 of the electronic device support stand 1. The electronic device cable 11 then carries a 5-V supply from the power supply unit to the electronic device 4.

As shown in FIG. 30, the electronic device cable 11 passes through an opening 271 from inside the base unit 3 along the axis of rotation of the pivot mechanism to the outside.

The cable management construction of the electronic device support stand 1 thus prevents the cable from being unplugged by pivoting the electronic device 4, prevents the cable from being damaged, and houses the power supply system inside the device and out of the way.

The scope of the invention is not limited to the foregoing embodiment, and includes the invention described in the accompanying claims and equivalents thereof.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronic device support stand comprising:
   a holder configured to hold an electronic device, the holder including a holder gear; and
   a base configured to support the holder, the base including a base gear having a first gear and a second gear;
   wherein the holder is configured to pivot from a first position for an operator to a second position for a customer around a pivot axis connected to the base,
   wherein the first gear is configured to secure the holder in the first position by engaging the holder gear, and the second gear is configured to secure the holder in the second position by engaging the holder gear, and
   wherein a portion of the base gear between the first gear and the second gear is devoid of a further gear and is configured such that it does not engage the holder gear.

2. The electronic device support stand described in claim 1, wherein:
   a number of angular positions at which the holder may be secured in the first position is the same as a number of angular positions at which the holder may be secured in the second position.

3. The electronic device support stand described in claim 2, wherein:
   the holder has an operating lever that releases the electronic device when operated by the user, and secures the electronic device when not operated by the user.

4. The electronic device support stand described in claim 1, wherein:
   a number of angular positions at which the holder may be secured in the first position is different from a number of angular positions at which the holder may be secured in the second position.

5. The electronic device support stand described in claim 1, wherein:
   the holder has a pressure member that pushes the holder gear in an engagement direction, which is a direction of movement to engage the base gear, and
   a contact surface of the pressure member and a contact surface of the holder gear are inclined to a direction perpendicular to the engagement direction.

6. The electronic device support stand described in claim 5, wherein:
   the holder gear is shaped so that a side of the holder gear contacts the first gear or the second gear before a distal end of the holder gear when moving in the engagement direction.

7. The electronic device support stand described in claim 1, wherein:
   the holder has an elastic member disposed between the holder and the base, the elastic member configured to be compressed and to apply torque to the holder.

8. The electronic device support stand described in claim 1, further comprising:
   a lock plate that is removably attachable to the electronic device, a distal end of the lock plate fitting into a fixed recess in the electronic device support stand when the electronic device to which the lock plate is attached is held.

* * * * *